(12) United States Patent
King

(10) Patent No.: US 7,381,022 B1
(45) Date of Patent: Jun. 3, 2008

(54) AUTOMATED 3-DIMENSIONAL MULTITASKING, STOCKING, STORAGE, AND DISTRIBUTION SYSTEM

(76) Inventor: Rodney Joe King, 125 Dungca Beach Way #406, Tamuning, GU (US) 96913

( * ) Notice: Subject to any disclaimer, the term of this patent is extended or adjusted under 35 U.S.C. 154(b) by 350 days.

(21) Appl. No.: 11/018,497

(22) Filed: Dec. 18, 2004

(51) Int. Cl.
*B65G 1/04* (2006.01)
(52) U.S. Cl. .................. 414/267; 414/807; 187/270
(58) Field of Classification Search ............... 414/267, 414/279, 807; 187/270
See application file for complete search history.

(56) References Cited

U.S. PATENT DOCUMENTS

| | | | | |
|---|---|---|---|---|
| 2,612,238 A | * | 9/1952 | Angelicola | 187/270 |
| 3,317,005 A | * | 5/1967 | Kehoe | 187/249 |
| 3,485,389 A | * | 12/1969 | Armington et al. | 414/282 |
| 3,647,026 A | | 3/1972 | Alexander et al. | |
| 4,372,219 A | * | 2/1983 | Gibbs | 104/165 |
| 4,865,155 A | * | 9/1989 | Montaigne et al. | 182/14 |
| 5,139,384 A | | 8/1992 | Tuttobene | |
| 5,271,703 A | | 12/1993 | Lindqvist | |
| 5,433,293 A | * | 7/1995 | Sager | 187/249 |
| 5,501,295 A | * | 3/1996 | Muller et al. | 187/406 |
| 5,595,263 A | | 1/1997 | Pignataro | |
| 6,022,180 A | | 2/2000 | Motoyama | |
| 6,231,291 B1 | * | 5/2001 | Mueller et al. | 414/277 |
| 6,234,737 B1 | | 5/2001 | Young et al. | |
| 6,309,162 B1 | * | 10/2001 | White | 414/273 |
| 6,416,270 B1 | * | 7/2002 | Steury et al. | 414/282 |
| 7,101,139 B1 | * | 9/2006 | Benedict | 414/281 |

* cited by examiner

Primary Examiner—James Keenan

(57) ABSTRACT

An automated storage and retrieval system wherein electrically driven, computer-controlled carriages (58) can navigate a system of rails (78) in three-dimensions. Multiple carriages (58) can independently operate at the same time to accomplish a task faster or to work on several different tasks at the same time. The rails (78) have a system of trap doors (95) that allow a carriage (58) to use a single reversible motor (67) to navigate the rails (78) in three-dimensions. With the carriage (58) in positioned in font of a bin position, the carriage mounted manipulating device (125) can move bins (115) to and from the racks (107) from either side with a single reversible motor (131). The rails (78) are electrified to provide power for the drive (67) and manipulator motors (131). A main computer (146) maintains the inventory, handles transactions and assigns tasks to the computer-controlled carriages (58). The system can be scaled to handle different types of items and can be configured to fit in the space available.

8 Claims, 28 Drawing Sheets

AUTOMATED 3-DIMENSIONAL MULTITASKING, STOCKING, STORAGE, AND DISTRIBUTION SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to item storage and distribution, specifically the automated stocking, storing and delivery of items to be sold, rented, checked out, transported or stored.

2. Background of the Invention

For years, there have been attempts to develop a practical automated storage and delivery systems for items to be sold, rented, checked out, transported or stored. The primary objectives are to make it more convenient for the user, more flexible, more reliable and less expensive to build and maintain. Most of the attempts at an automated store use a setup where identical items are placed in an ejection unit that dispenses the item on demand. U.S. Pat. No. 3,647,026 (1972) to Alexander et al and discloses an automated drive-in store using chutes, dispensers and ejectors. In general, currently known automated distribution facilities are primarily constructed with conveyors designed to move a bin up and down a line of item dispensers. When the bin is under the dispenser, the item is dumped into the bin or onto a conveyor by an actuator system. This requires an intricate one-of-a-kind arrangement of conveyors, chutes, elevators, actuators, sensors and stepper motors. Examples of these devices can be found in U.S. Pat. Nos. 5,595,263 (1997) to Pignataro, 6,234,737 (2001) to Young et al., and 5,890,136 (1999) to Kipp. Another group of patents has the item in bins that are manipulated by devices that operate in an x- and y-plane. Examples of these devices are found in U.S. Pat. Nos. 5,139,384 (1992) Tuttobene, and 6,022,180 (2000) to Motoyama et al. The shortcoming of these devices are that they are expensive to build and maintain, prone to malfunction and mistakes, handle one task at a time, operate slowly, can not make full use of existing storage space, items can be damaged by the drop into a bin or ripped apart by the conveyor. When stocking such a facility, the person stocking the facility is exposed to the hazards of moving machinery and is close proximity to the item, which allows for pilfering.

While each of the above-noted patents describe vending facilities which provide a certain degree of automated shopping for a customer, a need still exists for a mechanism which provides a more efficient and automated system.

OBJECTS AND ADVANTAGES

Several objects and advantages of the present invention are:

(a) to provide a plurality of electrically driven, computer-controlled carriage (EDC3) that can navigate a system of rails in three-dimensions;

(b) to provide a plurality of three-dimensional system of electrified rails that will support, guide and provide power to the EDC3;

(c) to provide a bin handling device attached to the EDC3 that can manipulate the bin from the EDC3 to the rack, and from the rack to the EDC3;

(d) to provide a plurality of bins that can be picked up and dropped off by the EDC3, the bins will be encoded to facilitate the EDC3 identifying the bin, the bin will serve as a holding device for an item or a plurality of items;

(e) to provide a plurality of racks to support the bins so that the bins can be accessed by the EDC3;

(f) to provide a system that will control the EDC3s so that several EDC3s can work to accomplish the same task simultaneously;

(g) to provide a system that will control the EDC3s so that several different tasks can be carried out congruently;

(h) to provide a system that will control the EDC3s so that some EDC3s can be storing items while other EDC3s are delivering items;

(i) to provide an EDC3 that only needs one reversible motor to navigate the matrix and one reversible motor to store and deliver items;

(l) to provide an EDC3 and rail system that is built of mostly stock parts, that can be put together in modular form;

(k) to provide a system design that does not need the precision of high cost stepper motors, servos, elevators, conveyors, transfer platforms, robotic arms, chutes, turntables, nor rail switchers;

(l) to provide the capacity of storing hundreds of varieties of items (m) to provide the capacity of storing as few as one unit of any type of item (n) to provide a setup where a customer can pick up his order from the comfort of his vehicle;

(o) to provide digital photo recording device that record each transaction digitally;

(p) to provide a setup where the bins can be loaded with items away from the dangers of moving parts and item loading can be accomplished with a minimum of errors and pilfering.

Further objects and advantages are to provide an ordering system that will be readily accessible to the customer and will handle monetary transactions. Still further objects and advantages will become apparent from a consideration of the ensuing description and drawings.

SUMMARY OF INVENTION

In accordance with the present invention, an electrically driven, computer-controlled carriage (EDC3) navigates on rails and can upon demand position itself to identify and manipulate a bin in order to deliver items to be sold, rented, checked out, transported or stored.

DRAWINGS

Figures

FIG. 7A is an inset that shows a perspective cutaway view of horizontal rails.

DRAWINGS

Reference Numerals

Figure 1:
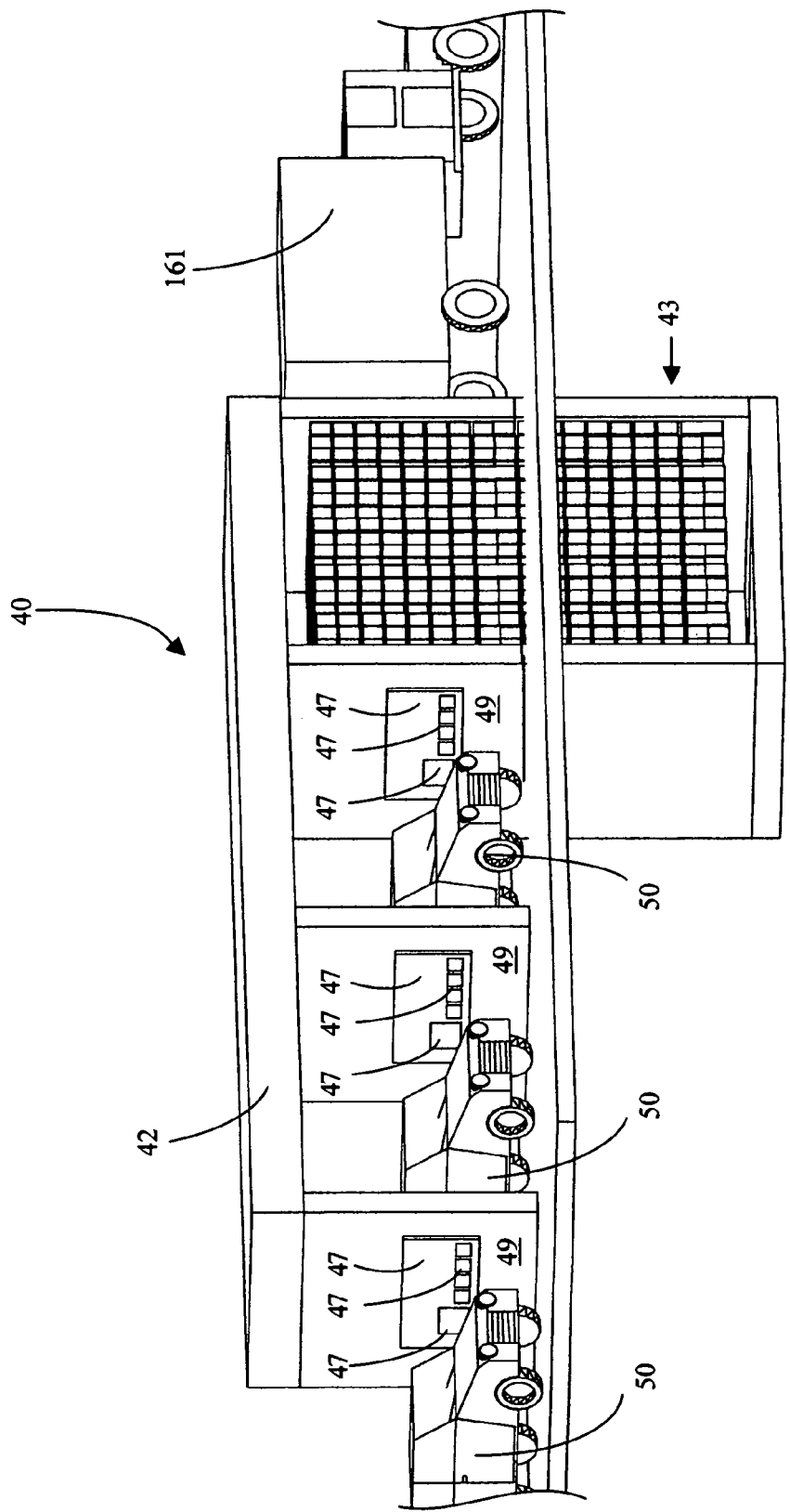
FIG. 1 shows a perspective view of an automated 3-dimensional, multitasking stocking, storage and distribution system (A3DMSSDS) for retailing items to a customer located in a vehicle, with a cut-away view of the insides of the storage facility.

| | |
|---|---|
| 40 | A3DMSSD Facility |
| 42 | enclosure |
| 43 | storage area |
| 46 | delivery access panel |
| 47 | customer interface device |
| 48 | delivery door |
| 49 | stalls |
| 50 | customer vehicle |
| 50B | parked vehicle |
| 51 | outer door |
| 52 | inner door |
| 53 | door interlock |
| 54 | imaging device |
| 56 | transport apparatus |
| 58 | Electrically Driven Computer-controlled Carriage (EDC3) |
| 59 | smart server |
| 60 | carriage frame |
| 61 | A-B rail guide |
| 62 | drive axel |
| 63 | drive axel insulator |
| 64 | drive bevel gear |
| 65 | drive brake |
| 66 | drive mechanical linkage |
| 67 | drive motor |
| 68 | x-direction drive toothed rotational device |
| 69 | z-direction drive toothed rotational device |
| 70 | big drive gear |
| 71 | small drive gear |
| 75 | A-B curve up rail |
| 76 | ratcheting rail |
| 77 | drive wheel |

| | -continued | |
|---|---|---|
| 78 | rail system | |
| 79 | horizontal rails | |
| 80 | vertical rails | |
| 81 | transition intersections | |
| 82 | rack rail | |
| 83 | sending rails | |
| 84 | delivering rails | |
| 85 | returning rails | |
| 86 | sending rails bend | |
| 87 | returning rails bend | |
| 88 | short vertical rails | |
| 89 | interlocking device | |
| 90 | horizontal rails running perpendicular | |
| 91 | upper horizontal rails | |
| 94 | hatch door | |
| 95 | trapdoor | |
| 96 | trapdoor torsion device | |
| 96B | hatch door torsion device | |
| 98 | stop | |
| 99 | small gap | |
| 100 | large gap | |
| 101 | trapdoor hinge device | |
| 101B | hatch door hinge device | |
| 107 | bin rack | |
| 108 | vertical rack support structure | |
| 109 | horizontal support surface | |
| 115 | bin | |
| 115B | bin for vehicle | |
| 116 | bin lip | |
| 117 | A-B bin grip | |
| 118 | stackable bin | |
| 119 | stackable bin lip | |
| 125 | Carriage Mounted Bin Manipulator (CMBM) | |
| 126 | CMBM frame | |
| 127 | A-B manipulator arm | |
| 128 | manipulator mechanical linkage | |
| 129 | manipulator arm chain | |
| 130 | manipulator arm sprocket | |
| 131 | manipulator motor | |
| 132 | manipulator brake | |
| 134 | bin hook | |
| 140 | equipment controller system. | |
| 141 | barcode | |
| 142 | component platform | |
| 143 | EDC3 digital imaging device | |
| 144 | Delivery digital imaging device | |
| 145 | Stocking digital imaging device | |
| 146 | Main Computer | |
| 147 | manipulator position indicator | |
| 148 | position sensor | |
| 149 | positioning indicator | |
| 150 | relay block | |
| 151 | Drive rotation sensor | |
| 152 | Barcode scanner | |
| 153 | mobile electromagnetic signal transceiver | |
| 154 | Stationary electromagnetic signal transceiver | |
| 155 | mobile control device | |
| 156 | manipulator position sensor | |
| 157 | data base | |
| 158 | remote override | |
| 160 | vendor access panel | |
| 161 | vendor vehicle | |
| 162 | A-B loading panel doors | |
| 200 | alternate ECD3 | |
| 201 | alternate ECD3 drive motor | |
| 202 | drive chain | |
| 301 | barcode product ID | |
| 302 | barcode bin ID | |
| 303 | barcode rack ID | |
| 400 | airport | |
| 401 | parking lot | |
| 402 | passenger car | |
| 403 | passenger access point | |
| 404 | security and screening | |
| 405 | terminal | |

| | -continued | |
|---|---|---|
| 406 | jet bridge | |
| 407 | airplane | |
| 500 | hospital | |
| 501 | patient room | |
| 502 | intensive care unit | |
| 503 | exam room | |
| 504 | operating room | |
| 505 | x-ray room | |
| 506 | emergency room | |
| 507 | kitchen | |
| 508 | storage room | |
| 509 | pharmacy | |
| 510 | laboratory | |
| 511 | trash and medical waste center | |
| 512 | restaurant table | |
| 513 | kitchen processing area | |
| 514 | smart server | |

DETAIL DESCRIPTION

Preferred Embodiment

FIGS. 1 to 13

FIG. 1 illustrates the preferred embodiment of the invention in the form of an automated 3-dimensional, multitasking stocking, storage and Distribution system (A3DMSSDS) 40. This system could be constructed to stand alone; or be built in conjunction with or retrofitted to existing facilities. The A3DMSSD 40 system is encased in an enclosure 42. The enclosure 42 is constructed of standard building materials to provide structure, protection, security and aesthetics. The enclosure 42 frames a plurality of customer stalls 49, the customer stalls 49 each have a delivery access panel 46. The delivery access panel 46 contains a customer interface device 47, and a plurality of delivery doors 48. A cut away view of the enclosure 42 exposes a storage area 43. A delivery vehicle 161 is shown backed up to the A3DMSSD 40. A customer vehicle 50 is shown parked in each of the stalls 49.

Figure 2:
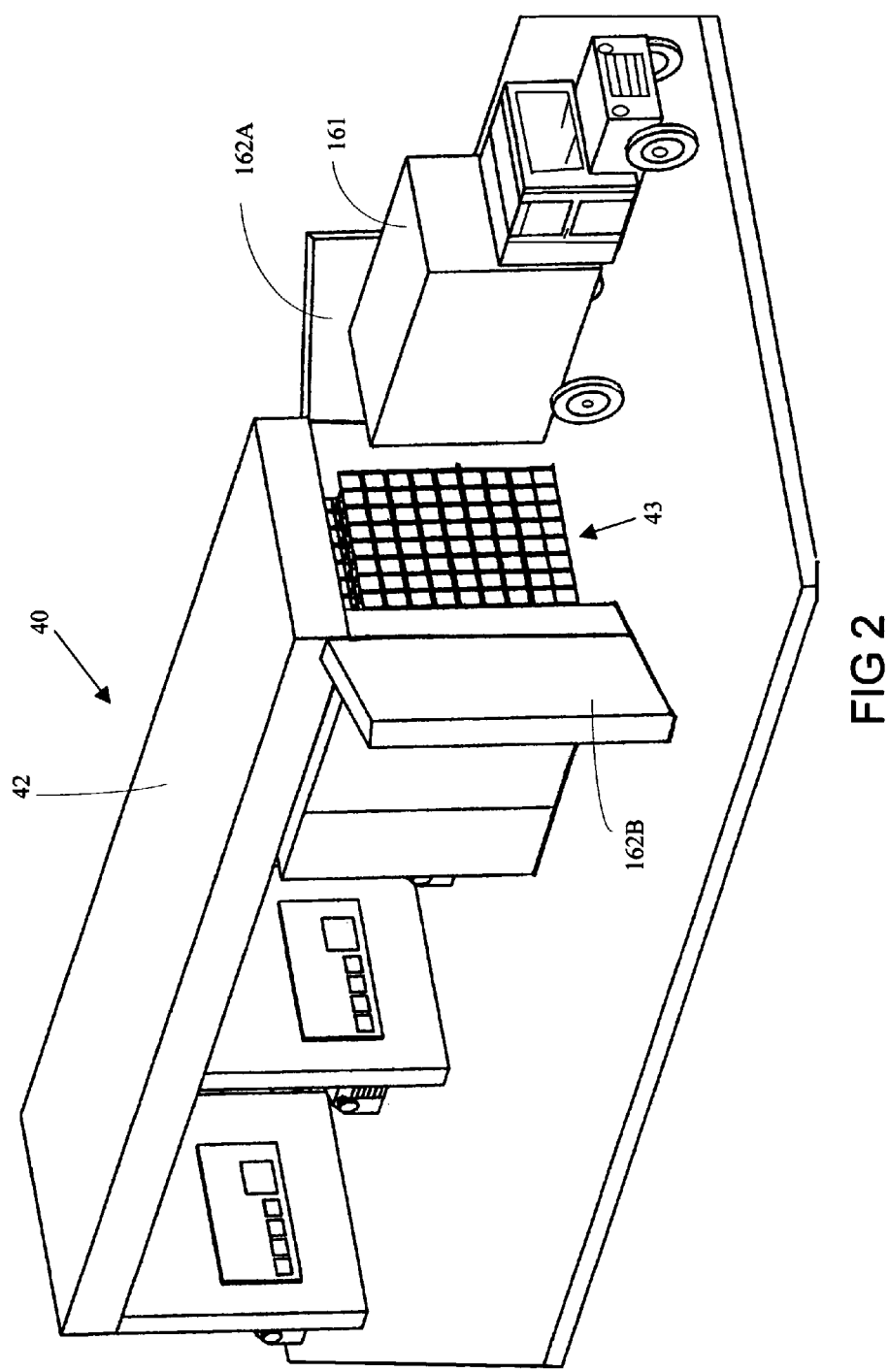
FIG. 2 shows a perspective view of the A3DMSSDS drive-in facility with the doors of the storage facility open to allow access to the storage facility.

FIG. 2 shows a set of loading panel doors 162A and 162B. The doors 162A and 162B are open to allow access to the storage area 43. The delivery vehicle 161 is shown backed up to the storage area 43.

Figure 3:
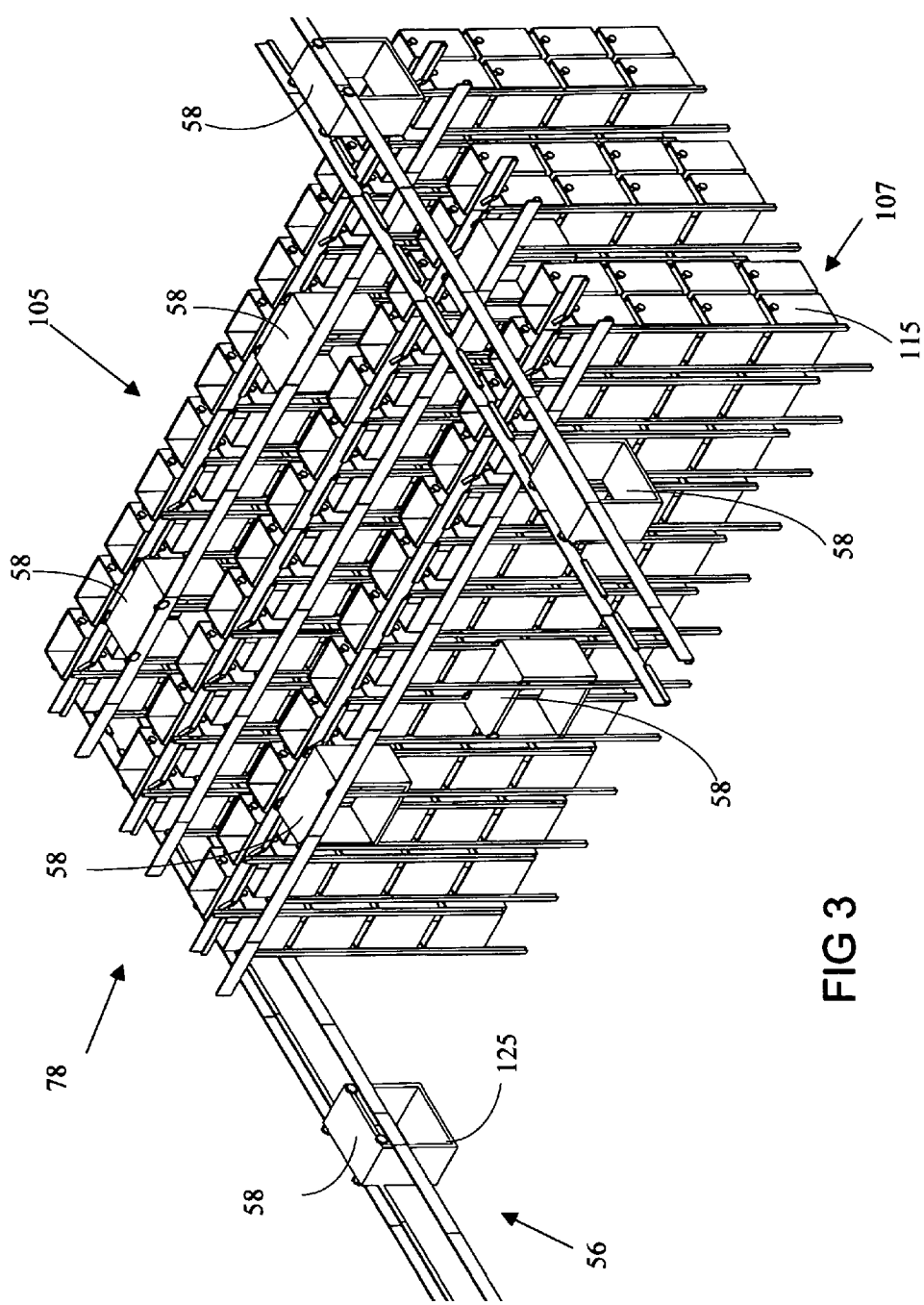
FIG. 3 shows a perspective view of the A3DMSSDS storage area with the enclosure removed.

FIG. 3 shows the preferred embodiment with the enclosure 42 removed, exposing a transport apparatus 56 and a storage system 105. The transport apparatus 56 consists of: a plurality of electrically driven computer-controlled carriages (EDC3) 58 with a carriage mounted bin manipulator (CMBM) 125 attached, and a rail system 78. The storage system 105 consists of a plurality of bins 115 and a system of bin racks 107.

Figure 4A:
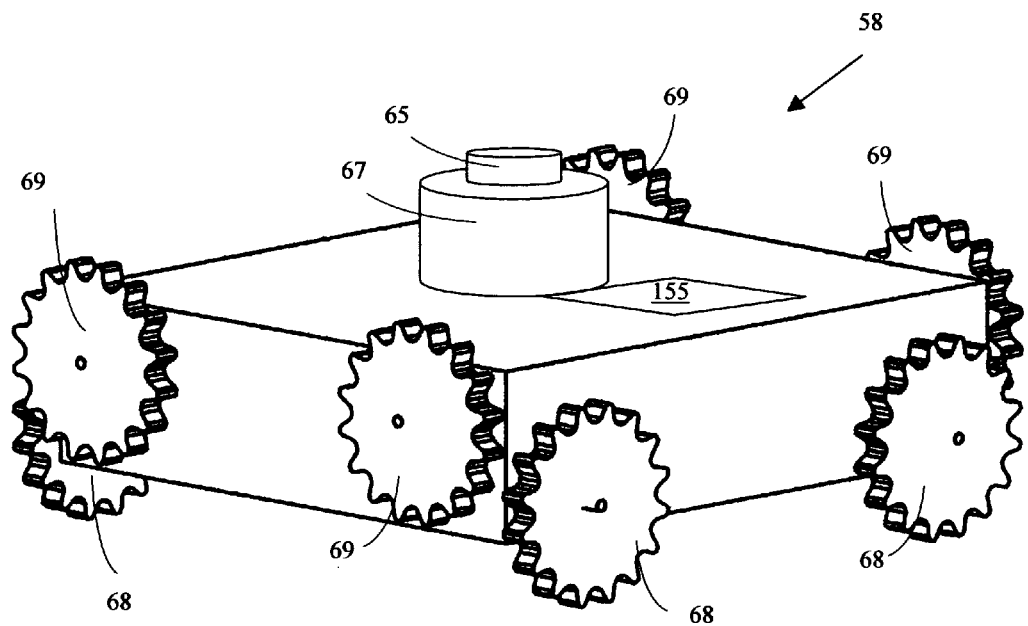
FIG. 4A shows a perspective view of EDC3 without the bin manipulator.

FIG. 4A shows the external parts the EDC3 58. The EDC3 58 consists of a carriage frame 60, an electric drive motor 67 with drive brake 65, a plurality of x-direction toothed rotational devices 68, a plurality of z-direction toothed rotational devices 69, and a mobile control device 155.

Figure 4B:
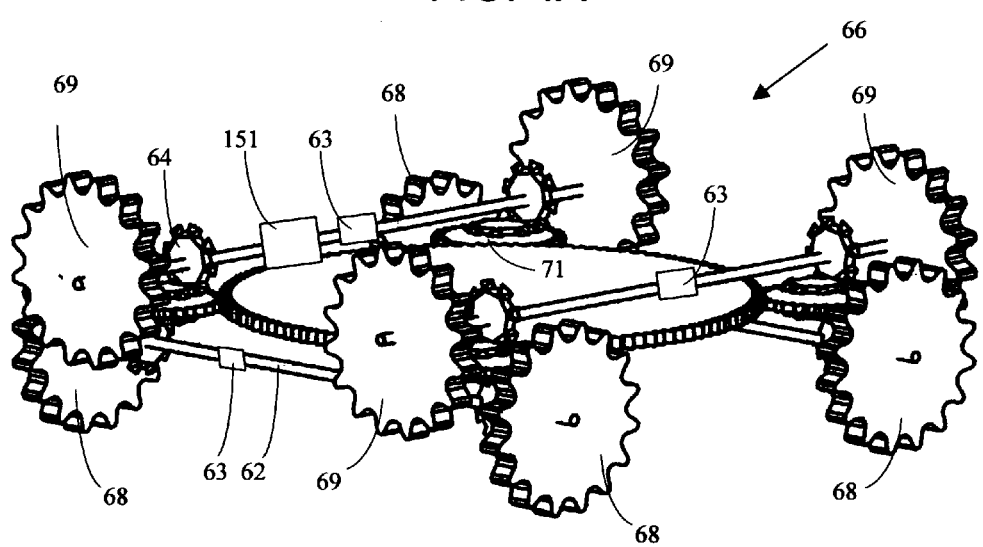
FIG. 4B shows an arrangement of the gears, axels and toothed rotational devices of the EDC3.

FIG. 4B shows a preferred embodiment of a drive mechanical linkage 66 with the carriage frame 60, and the drive motor 67 removed. Illustrated is an arrangement of a big drive gear 70, a plurality of small drive gears 71, a plurality of drive beveled gears 64, a plurality of drive axels 62, a plurality of drive axel insulators 63. The drive mechanical linkage 66 provides gearing to regulate rotation speed and torque. The drive mechanical linkage 66 incorporates non-conducting material such as nylon or other suitable plastic material electrically isolates the sections of the drive mechanical linkage 66.

The toothed rotational devices 68 and 69 are made of steel or other conductive material, and are mounted on all four sides of the carriage as illustrated in FIGS. 4A and 4B. A drive rotation sensor 151 is integrated into the drive mechanical linkage 66. The drive rotation sensor 151 counts the number of rotations of the drive mechanical linkage 66 and sends the count to the mobile control device 155.

Illustrated is only one of a number of possible arrangements of gears, sprockets, wheels, chains and belts to transfer rotational energy from the electric drive motor 67 to the toothed rotational devices 68, and 69

Figure 5:
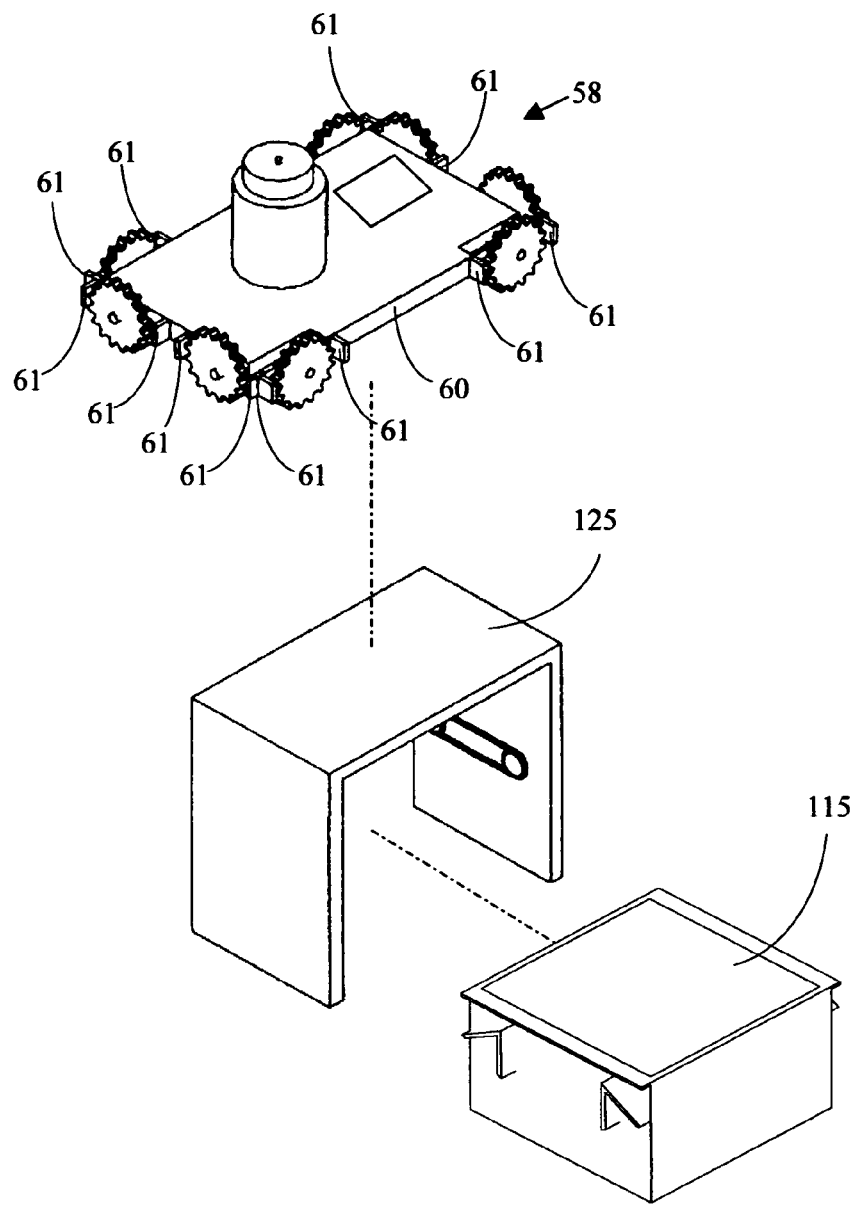
FIG. 5 shows a perspective-exploded view of EDC3 with bin manipulator and bin.

FIG. 5 shows an exploded view of the arrangement between the EDC3 58, the carriage mounted bin manipulator (CMBM) 125 and the bin 115. The EDC3 58 is shown with a plurality of rail guides 61. The rail guides 61 are mounted to the carriage frame 60 before and after each of the toothed rotational devices 68, and 69.

Figure 6:
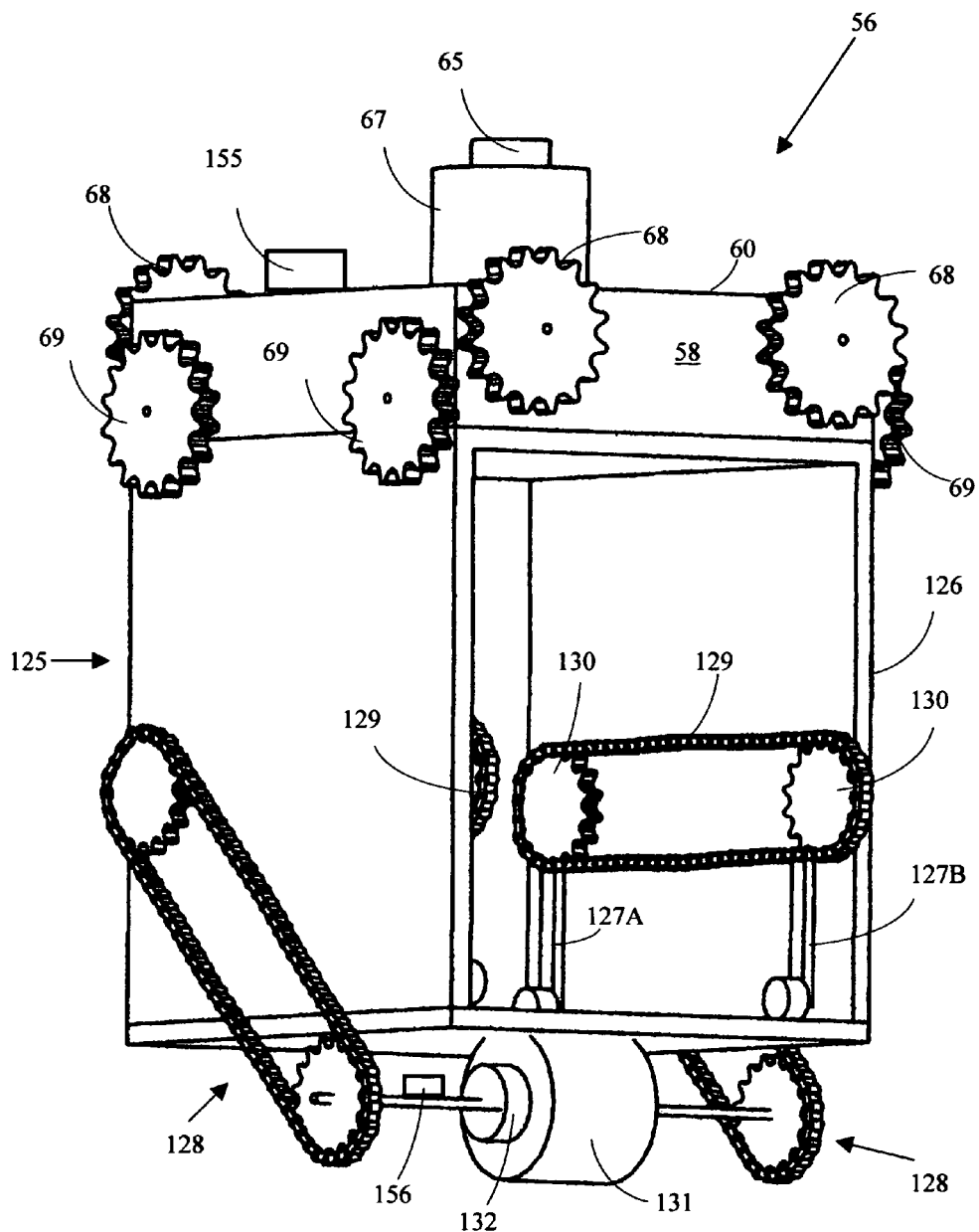
FIG. 6 shows a perspective view of an assembled EDC3 with bin manipulator.

FIG. 6 shows the CMBM 125 consisting of a CMBM frame 126, a plurality of manipulator arm sprockets 130, a plurality of manipulator arms 127, manipulator mechanical linkages 128, a manipulator motor 131, and a manipulator brake 132. The CMBM frame 126 is attached to the EDC3 58 carriage frame 60 by standard mechanical fasteners. The manipulator motor 131 is linked by the manipulator mechanical linkage 128 to rotate a set of manipulator arm sprockets 130 in synchronization on both sides of the CMBM 125. The manipulator arm sprockets 130 drives a manipulator arm chains 129 that drive the manipulator arms 127 that are attached perpendicular to the links of the manipulator arm chains 129. The manipulator brake 132 is integrated into the manipulator mechanical linkage 128, the brake 132 locks the manipulator arms 127 in place. A manipulator rotation sensor 156 is mounted to the manipulator mechanical linkage 128 to indicate the position of the manipulator arms 127. The manipulator motor 131, manipulator brake 132 and manipulator rotation sensor 156 are connected to the mobile control device 155 by wires; the wires are not shown.

Figure 7:
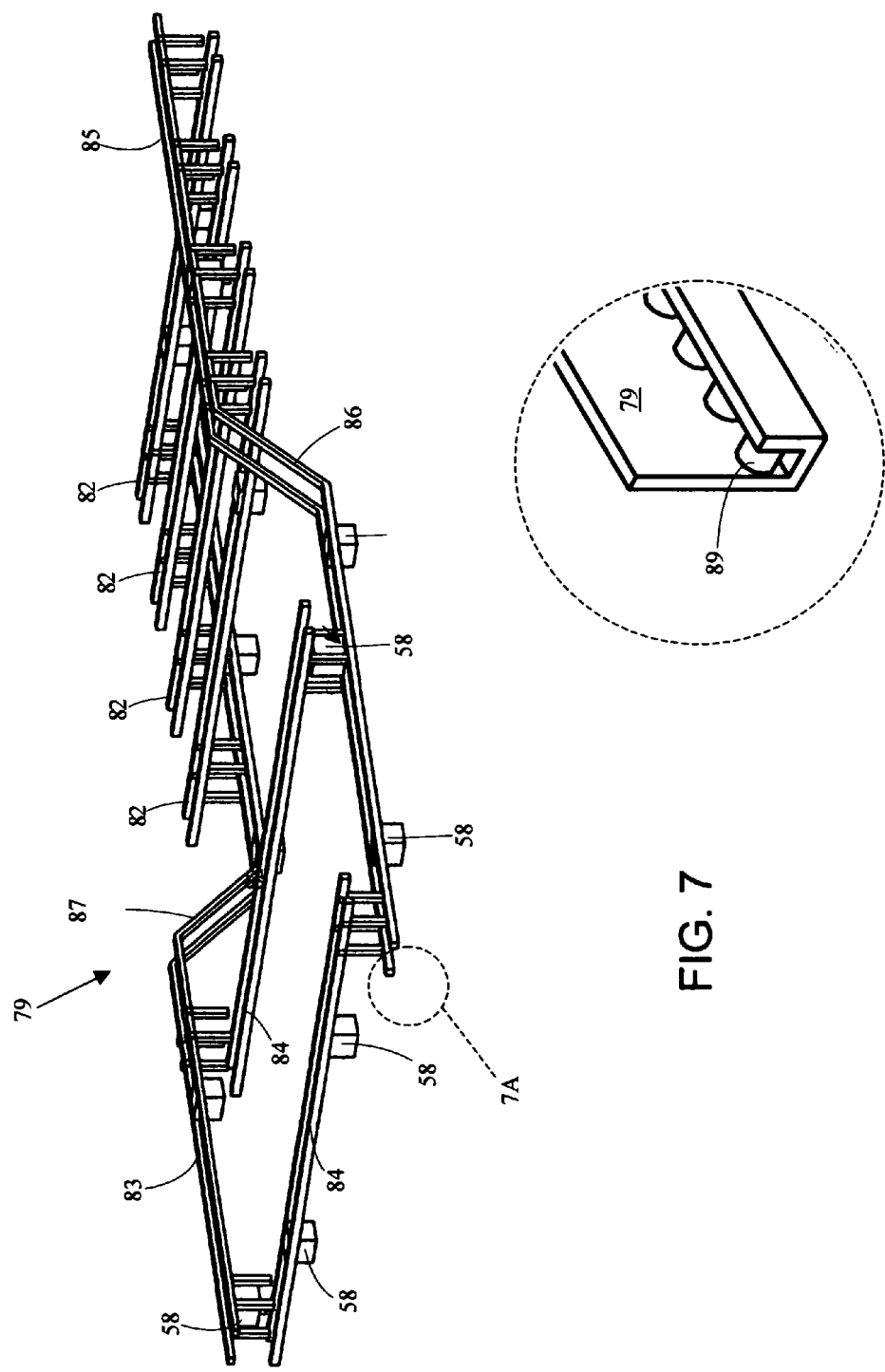
FIG. 7 shows a perspective view of horizontal rails with EDC3s attached.

FIG. 7 shows a plurality of horizontal rails 79, the horizontal rails 79 are divided into four sections: a plurality of rack rails 82, a plurality of sending rails 83, a plurality of delivering rails 84, and a plurality of returning rails 85. The horizontal rails 79 are paired and spaced apart the width of the EDC3 58. The horizontal rails 79 are made of strong, rigid, conductive material.

The inset FIG. 7A illustrates the horizontal rails 79 as an L-channel 92 fitted with a chain, slots, bars or other interlocking device 89 inside the channel 92. The horizontal rails 79 are mounted to a non-conducting or electrically isolated framework that is attached to a support structure of the enclosure 42. The framework is of standard construction, is not part of this invention and is not shown.

The rails of FIG. 7 are electrically energized with an electrical potential between paired rails. The electrical continuity between rails is provided by sections of conductive material not shown. The rack rails 82 are arrange parallel over a storage system 105, the sending rails 83, delivering rails 84 and returning rails 85 form a loop extending out from and then returning to the rack rails 82. There is a bend 86 in the sending rails 83. The bend 86 curves upward to increase elevation as the sending rails 83 go from the rack rails 82 to the delivering rails 84. There is a bend 87 in the returning rails 85. The bends 87 curves upward to increase the elevation as the returning rails 85 connect the delivery rails 84 to the rack rails 82. The delivery rails 84 are located over the delivery access panel 46.

Figure 8:
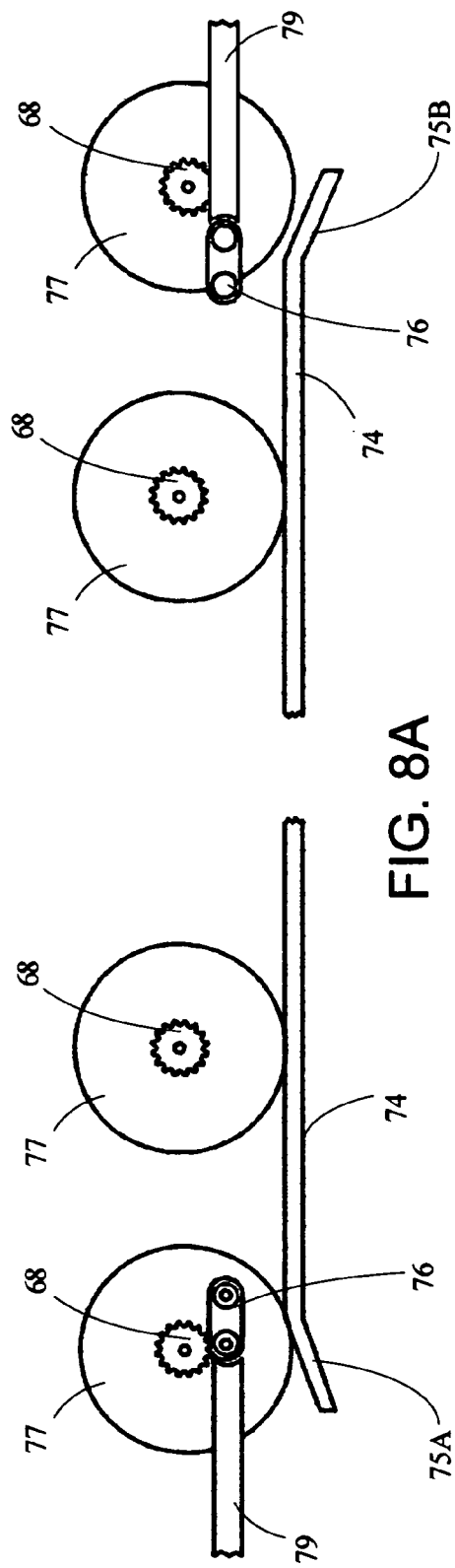
FIG. 8A shows an elevation view of horizontal rails with speed changing track.
FIG. 8B shows a head on view of toothed rotational device and wheel combination.

FIG. 8 is a side elevation view of an alternate arrangement of the horizontal rails 79. Flat rails 74 run underneath the horizontal rails 79. At both ends of the flat rails 74, there are curving up rails 75A, at other ends of the flat rails 74 there are curving down rails 75B. As the horizontal rails 79 extend over the curves 75A and 75B, where there are ratcheting endless chains 76 that ratchet forward over the top of the curves 75A and 75B. Wheels 77 mounted to the EDC3's 58 toothed rotational devices 68 roll up the curve 75A to the flat rails 74, as the wheels 77 go up so do the toothed rotational devices 68. While the toothed rotational devices 68 and the wheels 77 are both engaged, the toothed rotational devices 68 causes the ratcheting endless chains 76 to ratchet forward to compensate for the change in speed of the toothed rotational device 68. While the wheels 77 roll on the flat rails 74, the toothed rotational devices 68 disengage from the horizontal rails 79. When the wheels 77 roll down the curve 75B the toothed rotational devices 68 engage the ratcheting endless chains 75B. The ratcheting forward compensates for the differences in speed.

Figures 9, 9A:
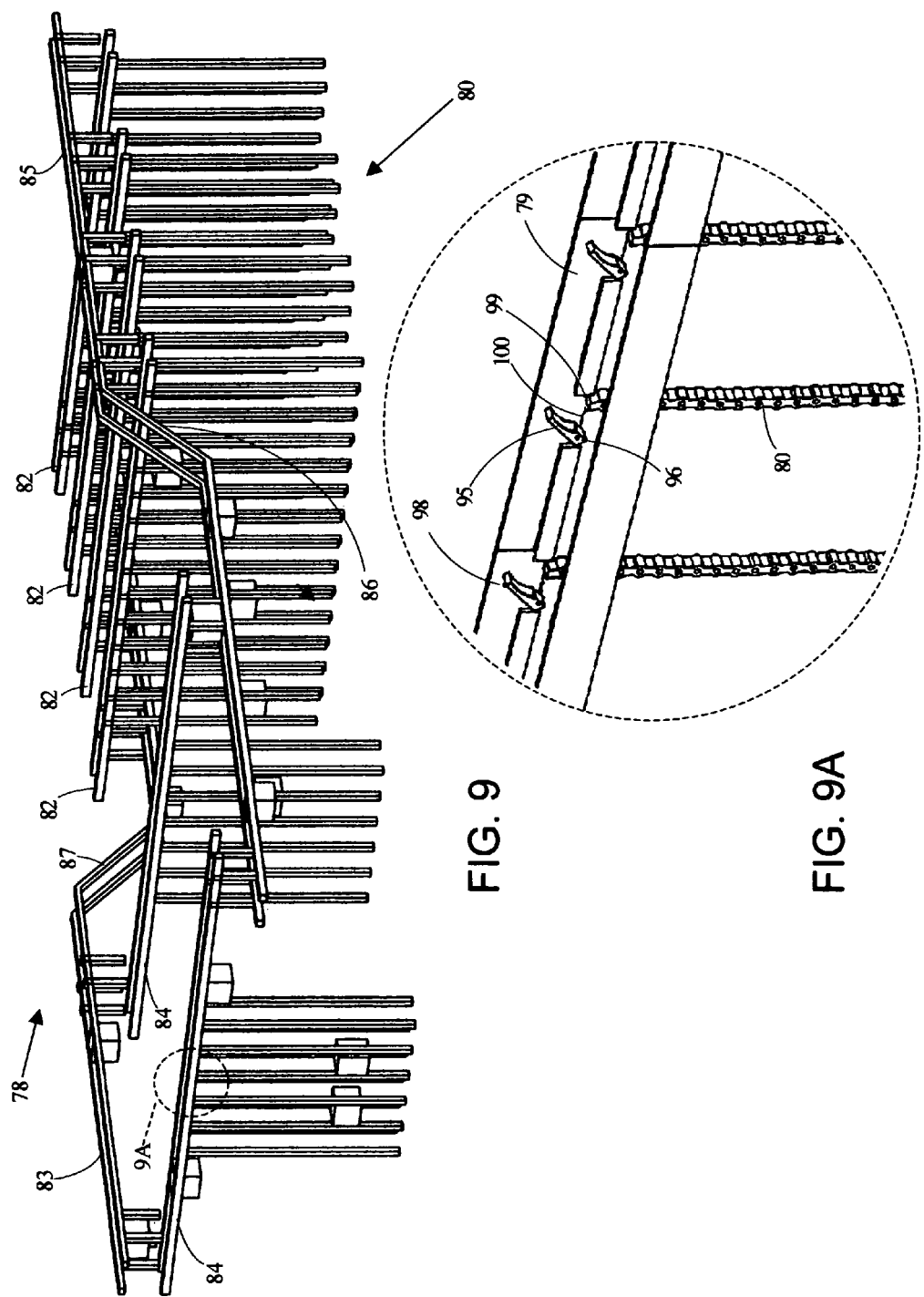
FIG. 9 shows a perspective view of horizontal and vertical rails with EDC3s attached.
FIG. 9A is an inset that shows a perspective view of a trapdoor.

As shown in FIG. 9 shows a plurality of vertical rails 80, the vertical rails 80 are attached perpendicularly to the horizontal rails 79 at predetermined locations. FIG. 9A is an inset that shows where the vertical rails 80 attach to the horizontal rails 79 forming two breaks in the horizontal rails 79. The vertical rails 80 are made of roller chain, the vertical rails 80 could also be made from link chain, slotted bars, channel with cross members or other interlocking devices that provide traction for the toothed rotational devices 68 without slippage. The vertical rails 80 are anchored at the top and the bottom. The top of the vertical rails 80 are inline with the horizontal rails 79, spaced to leave small gaps 99, and large gaps 100 between the horizontal rails 79 and the top of the vertical rails 80.

Trapdoors 95 cover the gaps 99 and 100 in the horizontal rails 79. The trapdoors 95 are constructed of strong, conductive material that can be machined, molded or shaped. The trapdoors 95 have torsion mounted hinge devices 96 that work to keep the trapdoors 95 in the open position until a downward force applied to the top of the trapdoors 95 close the-trapdoors 95 and completes the horizontal rails 79. The torsion mounted hinge devices 96 consist of springs, elastic bands, counterweights, magnets, solenoids, actuators, electric motors or other torsion-supplying devices. There are stops 98 to restrict the arc of rotation for the trapdoors 95.

Figure 10:
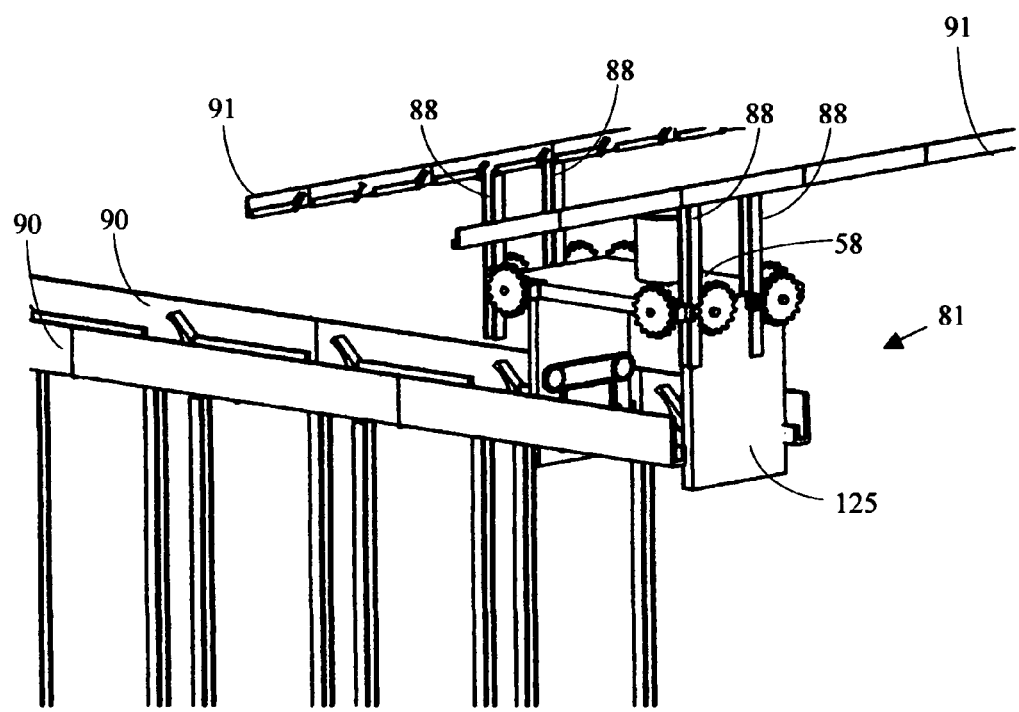
FIG. 10 shows a perspective view of an EDC3's transition intersection.

FIG. 10 illustrates a transition intersection 81; the transition intersection 81 has the trapdoors 95, a plurality of short vertical rails 88. The trapdoors 95 open to the short vertical rails 88 that end just above the horizontal rails running perpendicular 90 to the upper horizontal rails 91. The EDC3 58 with CMBM 125 are attached to the four short vertical rails 88.

Figure 11:
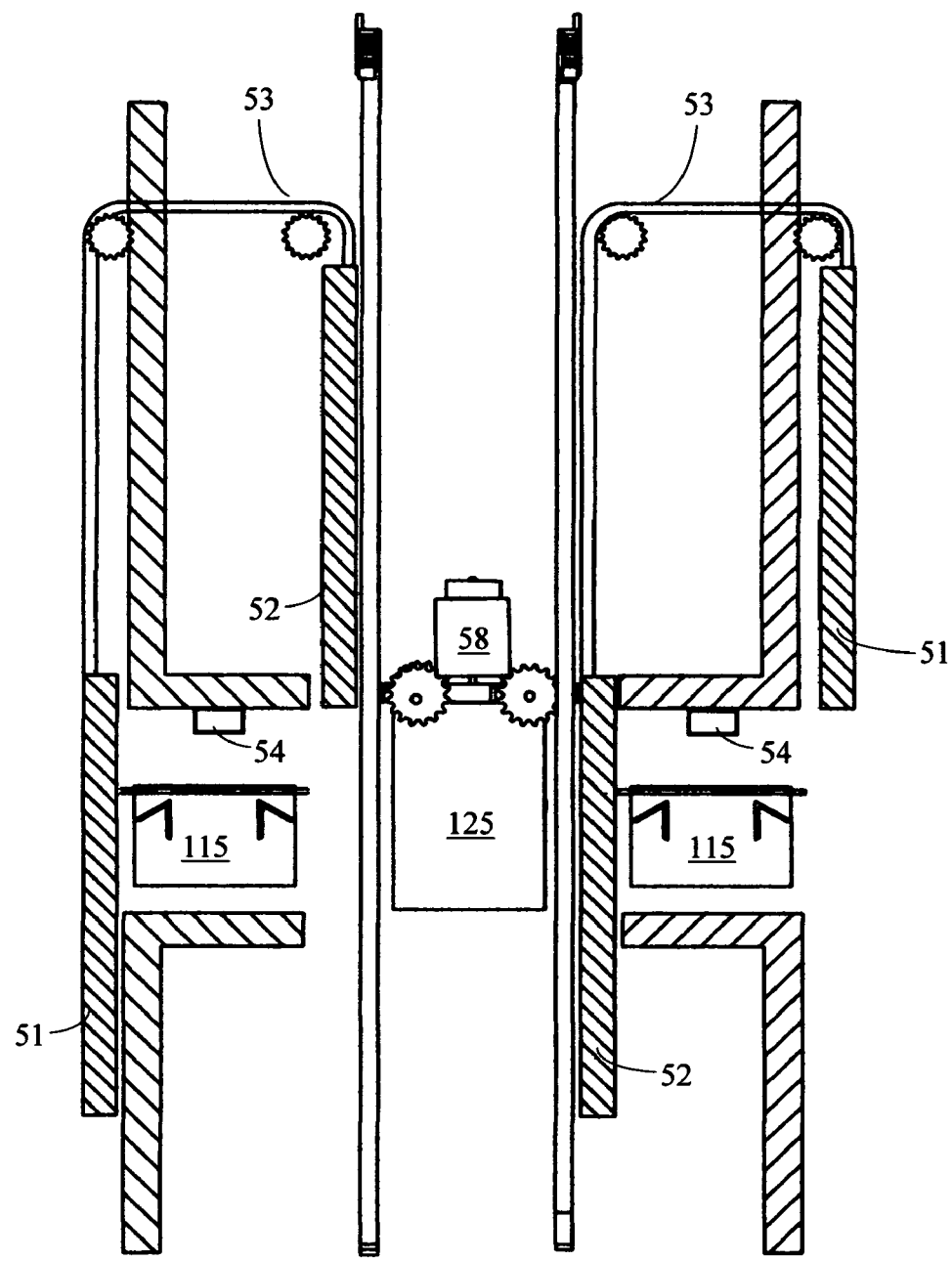
FIG. 11 is an elevation cutaway view of the customer stall delivery system.

FIG. 11 shows a cut away view of the delivery doors 48. The delivery doors 48 consists of an inner door 52 and an outer door 51 that are connected by a door interlock 53. The EDC3 58 with CMBM 125 is attached to the vertical rails 80. Two bins 115 are shown with an imaging devices 54 mounted above the bins 115.

Figure 12:
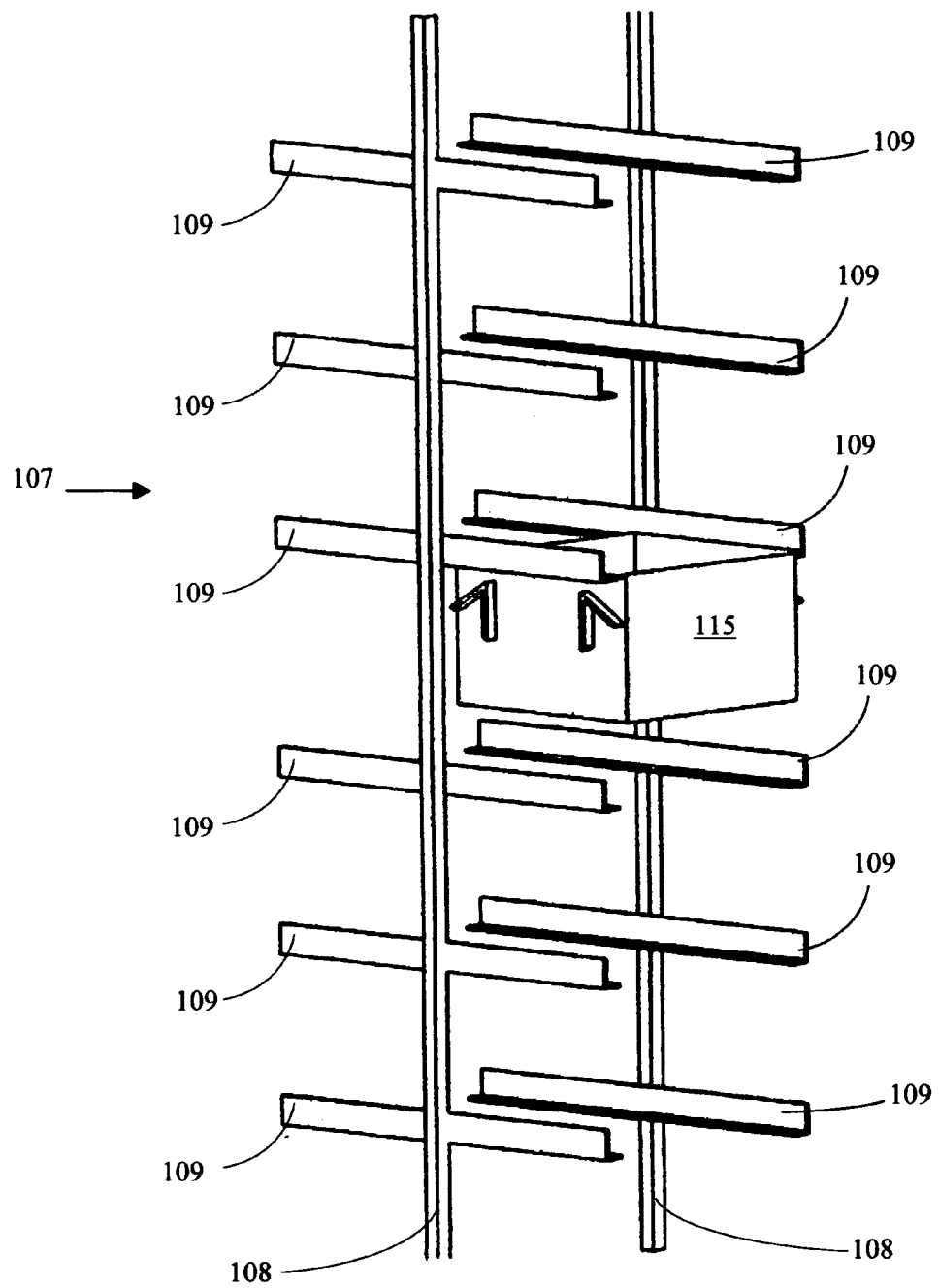
FIG. 12 shows a perspective view of cantilever shelves with one bin.
Figures 13A, 13B:
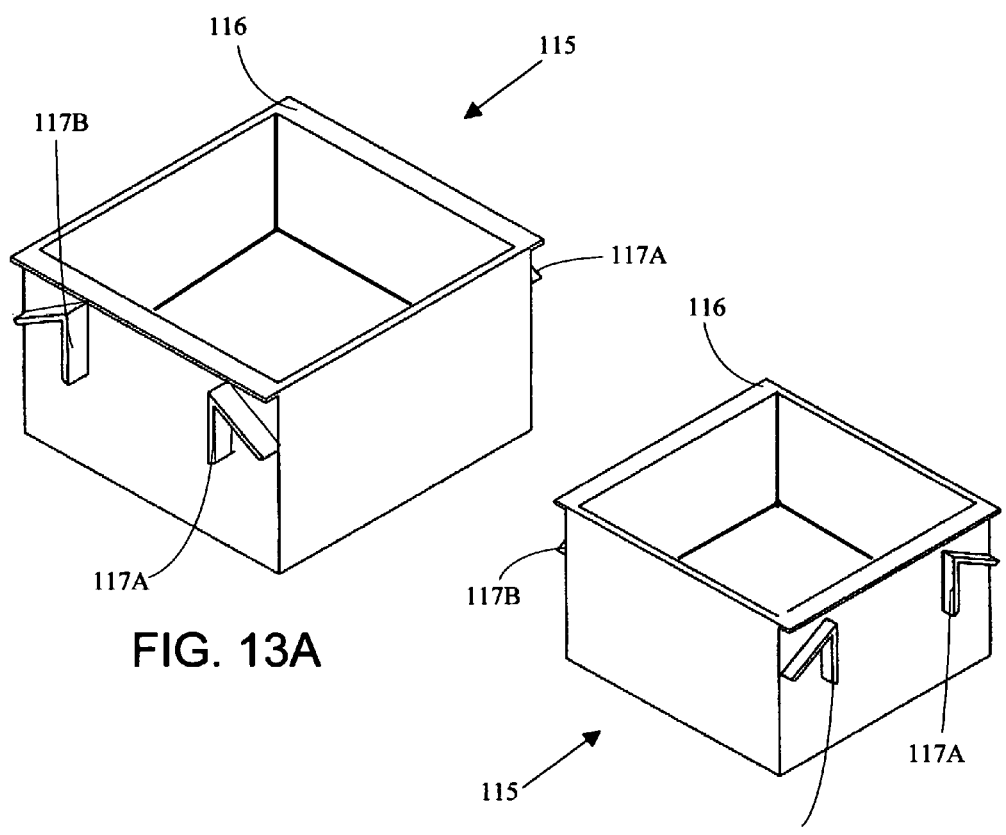
FIG. 13A shows a perspective view of a bin.
FIG. 13B shows a perspective view of a bin rotated 90 degrees.

FIG. 12 shows the bin racks 107 consisting of rack posts 108 with a plurality of horizontal support surfaces 109 mounted to the rack posts 108. The horizontal support surfaces 109 can be mounted at multiple points or mounted as cantilever supports. The bin racks 107 will support bins 115 on both sides of the column FIG. 13A and FIG. 13B show the preferred embodiment of the bins 115. The bin 115 is made of durable non-conducting material with bin lips 116 on two sides. The bin lips 116 allow the bins 115 to slide in and out of the horizontal support surfaces 109. When the bins 115 are stored in the bin rack 107 the bin lips 116 rest on the horizontal support surfaces 109. The bins 115 have bin grips 117 to allow for delivery and removal of the bin bins 115 to and from the bin racks 107. The size and shape of the bins 115 can be adjusted to accommodate items that are to be transported or stored.

Operation of Preferred Embodiment

FIGS. 2, 4A-B, 7, 11, 14A-H, 15A-D, 16, 17A-F, 18

FIGS. 4A and 4B illustrated the operation of the EDC3 58. The drive motor 67 provides rotational energy to the big drive gear 70; the mechanical energy is transferred to the small drive gears 71. The size of the gears is adjusted to provide the proper speed to torque requirements. The drive beveled gears 64 change the direction or rotation from the x-plane to the y-plane and z-plane. The drive axels 62 run through the drive beveled gears 64 and attach to the toothed rotational devices 68 and 69. In this way, rotational mechanical energy is transferred to the toothed rotational devices 68 and 69. When the drive brake 65 is on, the drive mechanical linkage 66 holds the EDC3 58 locked in place. The toothed rotational devices 68 and 69 are electrically isolated from one another by the drive axel insulators 63 and by using non-conducting material for the big drive gear 70. The drive rotation sensor 151 counts the number of turns the drive axels 62 makes. This information is sent to the mobile control device 155. The mobile control device 155 starts, stops, and controls the direction of rotation of the drive motor 67 and applies and releases the drive brake 65. The mobile control device 155, the drive motor 67, and the drive brake 65 receive power from a brush or a bushing (not shown) that connect to each of the drive axles by standard engineering practices. The brushes, drive motor 67, drive brake 65 and the drive rotation sensor 151 are connected to the control unit by wires (not shown).

Figure 18:
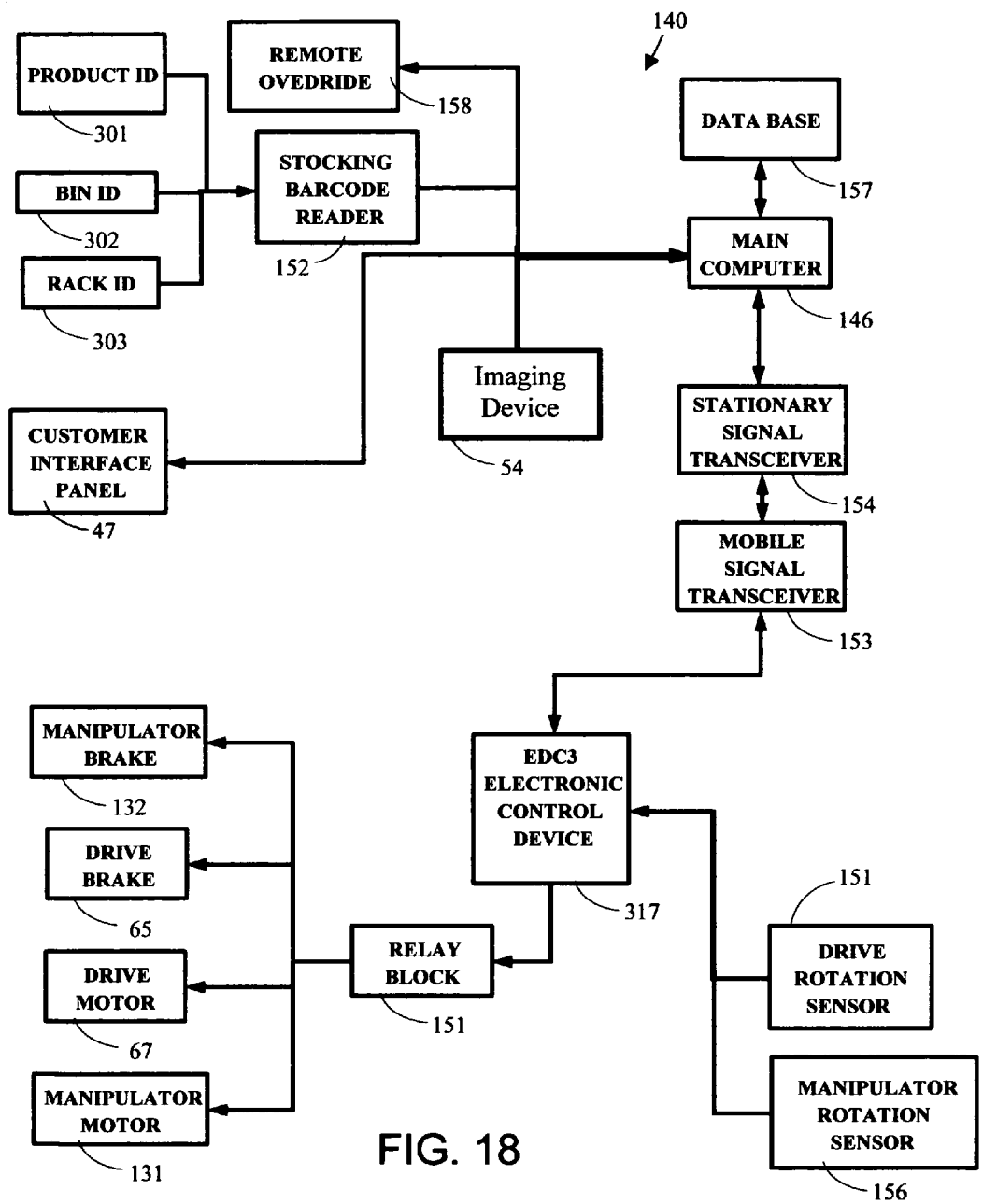
FIG. 18 is a block diagram of the A3DMSSDS operation.

FIG. 11 illustrates how the door interlock 53 prevents both doors 51 and 52 from being open at the same time. The outer door 51 opens to allow access to the item in the bins 115; the inner door 52 prevents contact with electrified vertical rails 80. When the outer door 51 is closed, the inner door 52 is opened. The EDC3 58 lowered the CMBM 125 to a position where it can manipulate the bin 115 from either side. The imaging device 54 records an image and transmits the image to the database 157 (FIG. 18). The image is linked to the transaction to allow verification of the content of the bin 115 when the bin 115 was delivered.

Figure 14A:
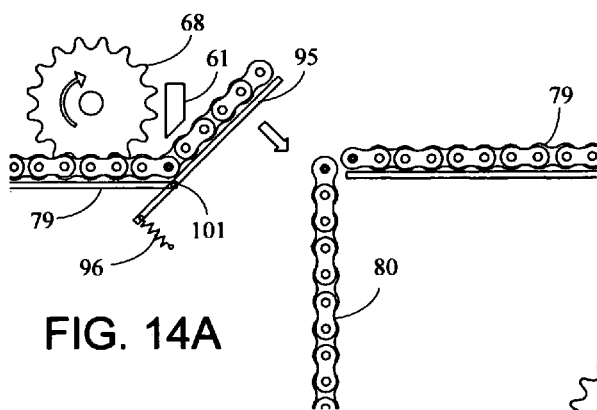
FIGS. 14A to 14G show elevation views of the steps of the trapdoor's operation.
Figure 14B:
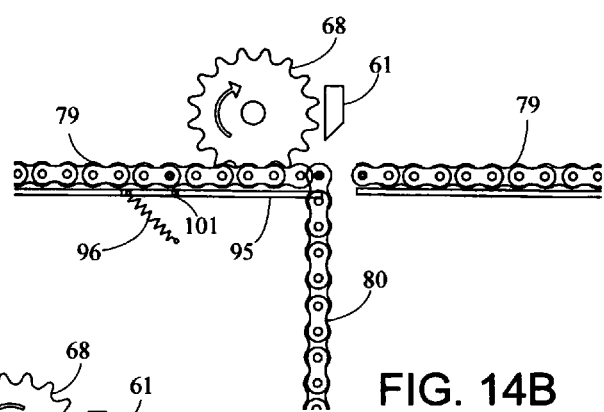
Figure 14C:
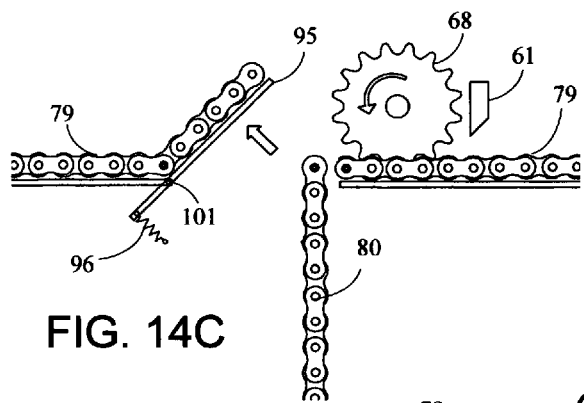
Figure 14D:
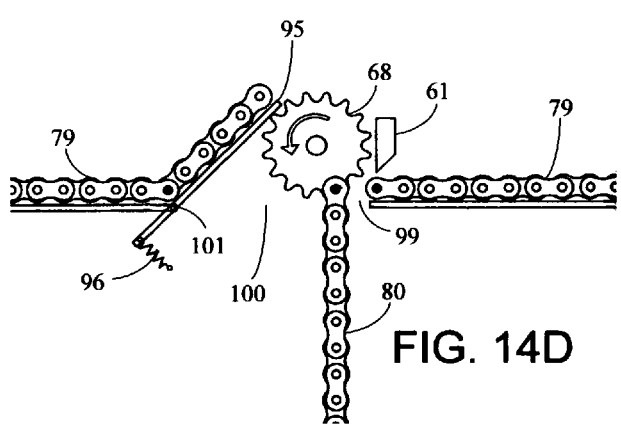
Figure 14E:
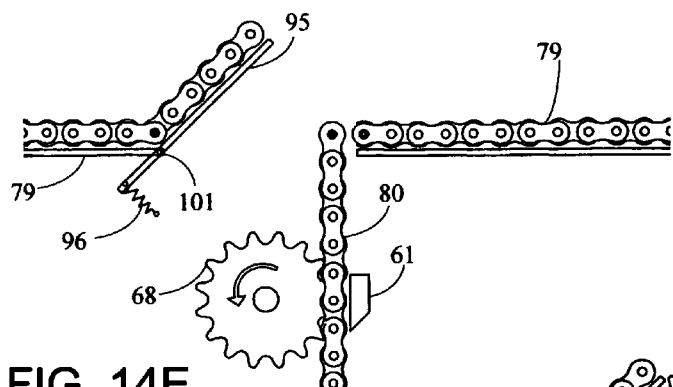
Figure 14F:
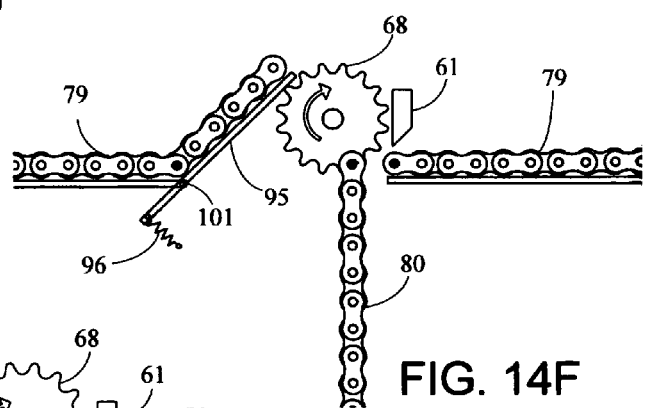
Figure 14G:
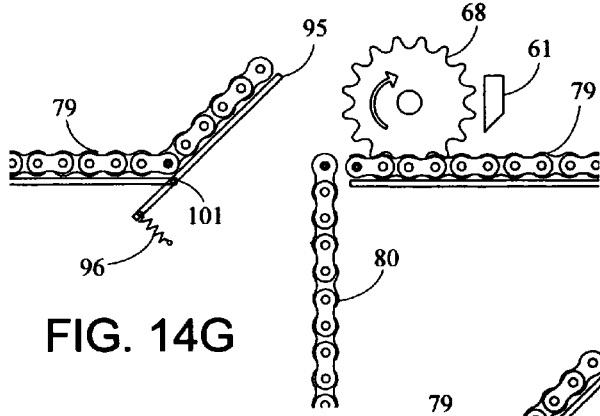
Figure 14H:
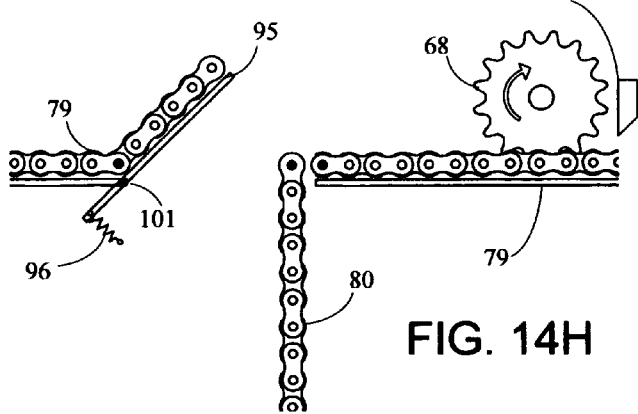

FIGS. 14A-H illustrated the operation of a single trapdoor 95. FIG. 14A show the toothed rotational device 68 traveling on the interlocking device 89. The intermeshing of the toothed rotational device 68 and the interlocking device 89 prevents slippage. Approaching the trapdoor 95, the arrow indicates the direction of rotation. FIG. 14B demonstrates the toothed rotational device 68 mashing the trapdoor 95 down and covering the access to the vertical rails 80 thus allowing the toothed rotational device 68 to continue on the horizontal rail 79. FIG. 14C illustrates the toothed rotational device 68 reversing direction and heading toward the trapdoor 95 that is now held open by the torsion mounted hinge device 96. FIG. 14D demonstrates how the toothed rotational device 68 pivots around the top of the vertical rail 80 and is guided by the bottom side of the trapdoor 95 as the toothed rotational device 68 continues to pivots the rail guide 61 slips into the small gap 99. FIG. 14E illustrates the toothed rotational device 68 held against the vertical rail 80 by the rail guide 61. FIG. 14F demonstrates how the toothed rotational device 68 pivots around the top of the vertical rail 80 and is guided by the bottom side of the trapdoor 95, as the toothed rotational device 68 continues to pivots the rail guide 61 slips out of the small gap 99. FIG. 14G and FIG. 14H demonstrate the toothed rotational device 68 continuing to travel down the horizontal rail 79.

Figure 15A:
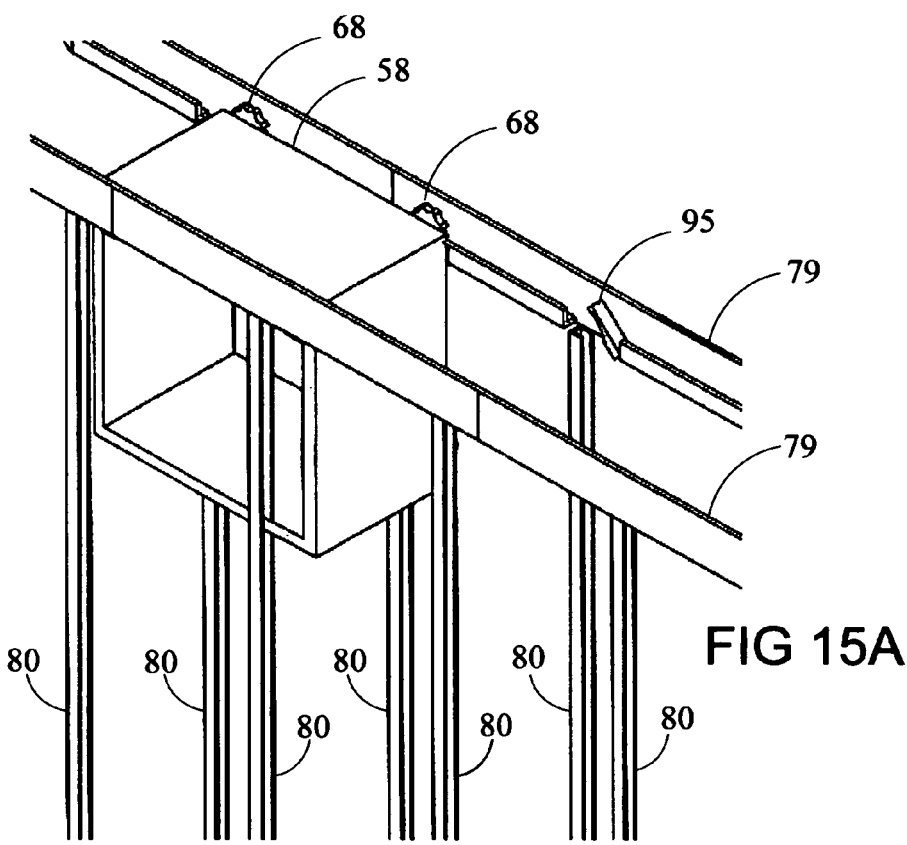
FIG. 15A shows an EDC3 positioned on the horizontal rails passing over the trapdoor.

FIGS. 15A-D illustrated the operation of the EDC3 58 transitioning from the horizontal rails 79 to the vertical rails 80. FIG. 15A illustrates the EDC3 58 closing and rolling over the-trapdoors 95.

Figure 15B:
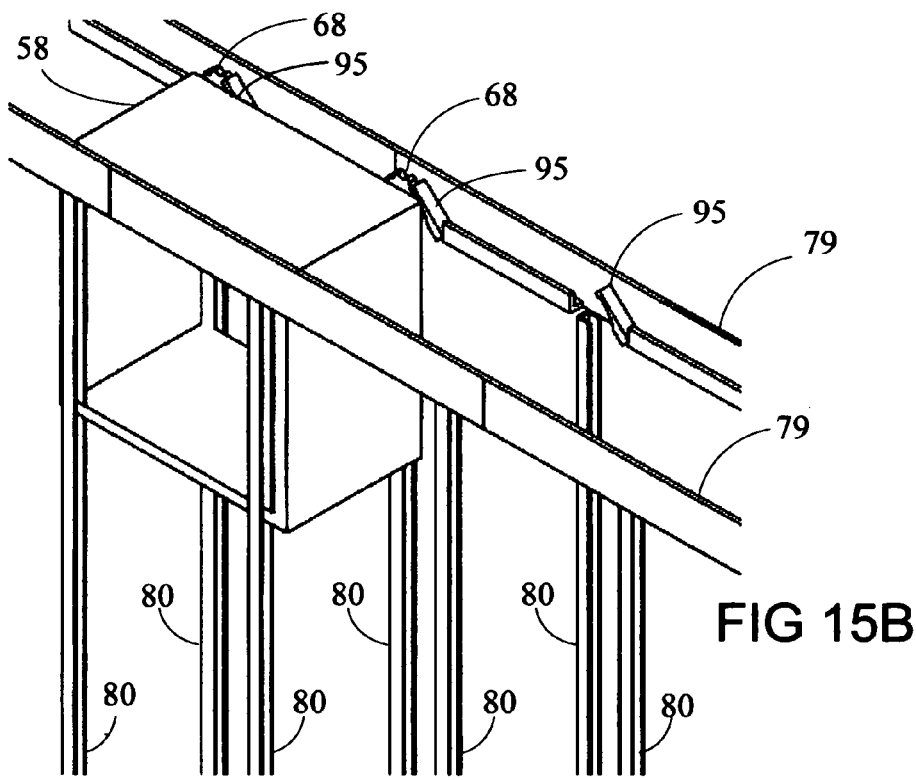
FIG. 15B shows an EDC3 positioned on the horizontal rails entering the trapdoor.
Figure 15C:
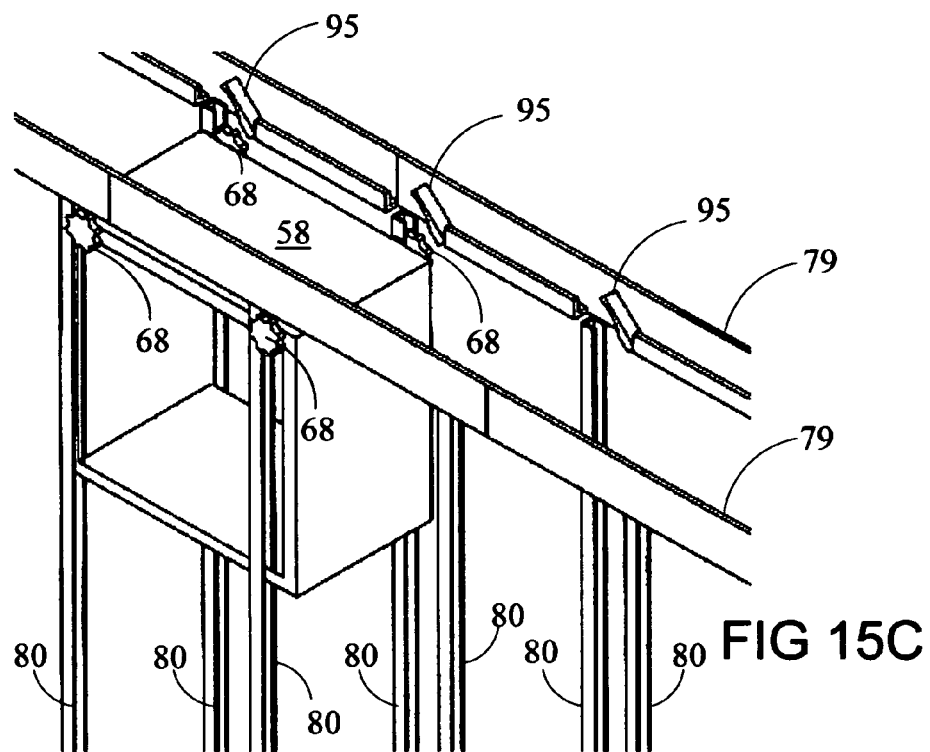
FIG. 15C shows an EDC3 positioned on the vertical rails.
Figure 15D:
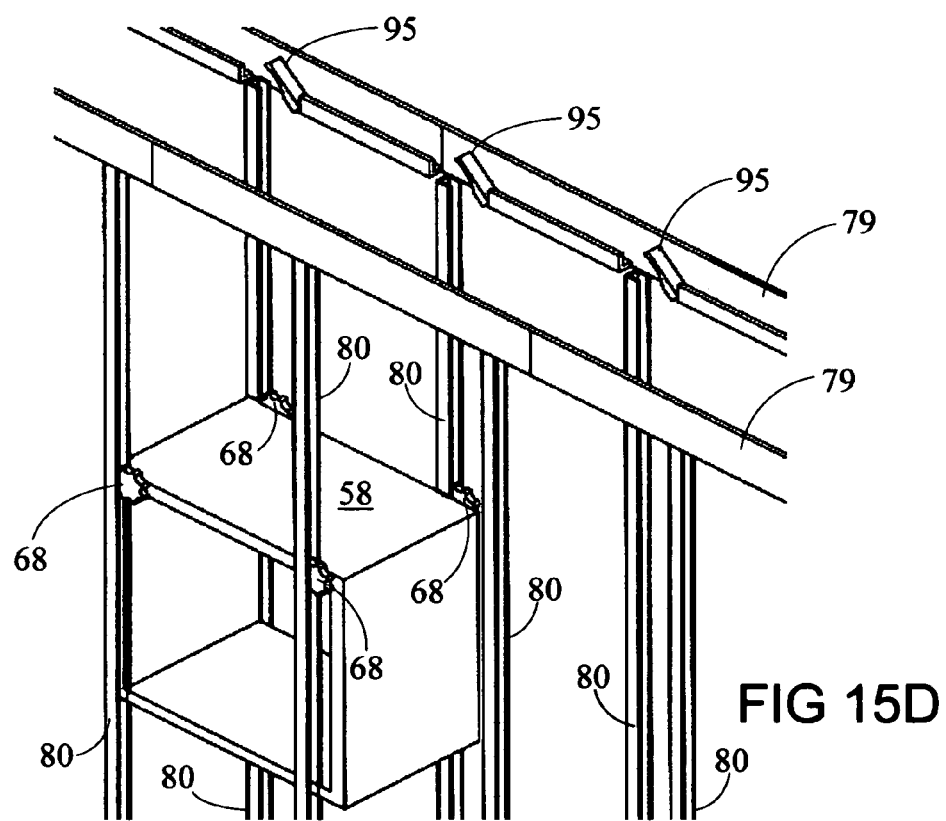
FIG. 15D shows an EDC3 stopped on the vertical rails.

When the EDC3 58 is going in the direction that closes the-trapdoors 95 the EDC3 58 will continue on down the horizontal rails 79. After the carriage passes over the trapdoors in one direction the mobile controls device 155 reverse the drive motor 67 and the EDC3 58 goes in the reversed direction, FIG. 15B illustrates the EDC3 58 reversing rotation on the toothed rotational devices 68 and entering the-trapdoors 95. The toothed rotational devices 68 or 69 are guided under the trapdoors 95, and as the toothed rotational devices 68 or 69 rotate around the top of the vertical rails 80, the rail guides 61 locks the toothed rotational devices 68 or 69 into the vertical rails 80. In this way the EDC3 58 is powered down the vertical rails 80 with four points of attachment, as shown in FIG. 15C. This changes the direction of travel from the horizontal x-direction to the vertical y-direction. When the EDC3 58 is lowered to the desired position on the vertical rails 80 the mobile control device 155 cuts power to the drive motor 67 and applies power to the drive brake 65 to hold the EDC3 58 locked in position, an EDC3 58 in the locked position is illustrated by FIG. 15D. When the EDC3 58 is ready to resume traveling the sequence is reversed. The mobile control device 155 cuts power to unlock the drive brake 65 and applies electrical power to the drive motor 67, the EDC3 58 climbs back up the vertical rails 80. When the EDC3 58 reaches the top of the vertical rails 80, the underside of the-trapdoors 95 serves as a guide to hold the toothed rotational devices 68 or 69 as the toothed rotational devices 68 or 69 rotate around the top of the vertical rails 80. In this way the EDC3 58 is powered onto the horizontal rails 79. This changes the direction of travel from the vertical y-direction to the horizontal x-direction.

Figure 16:
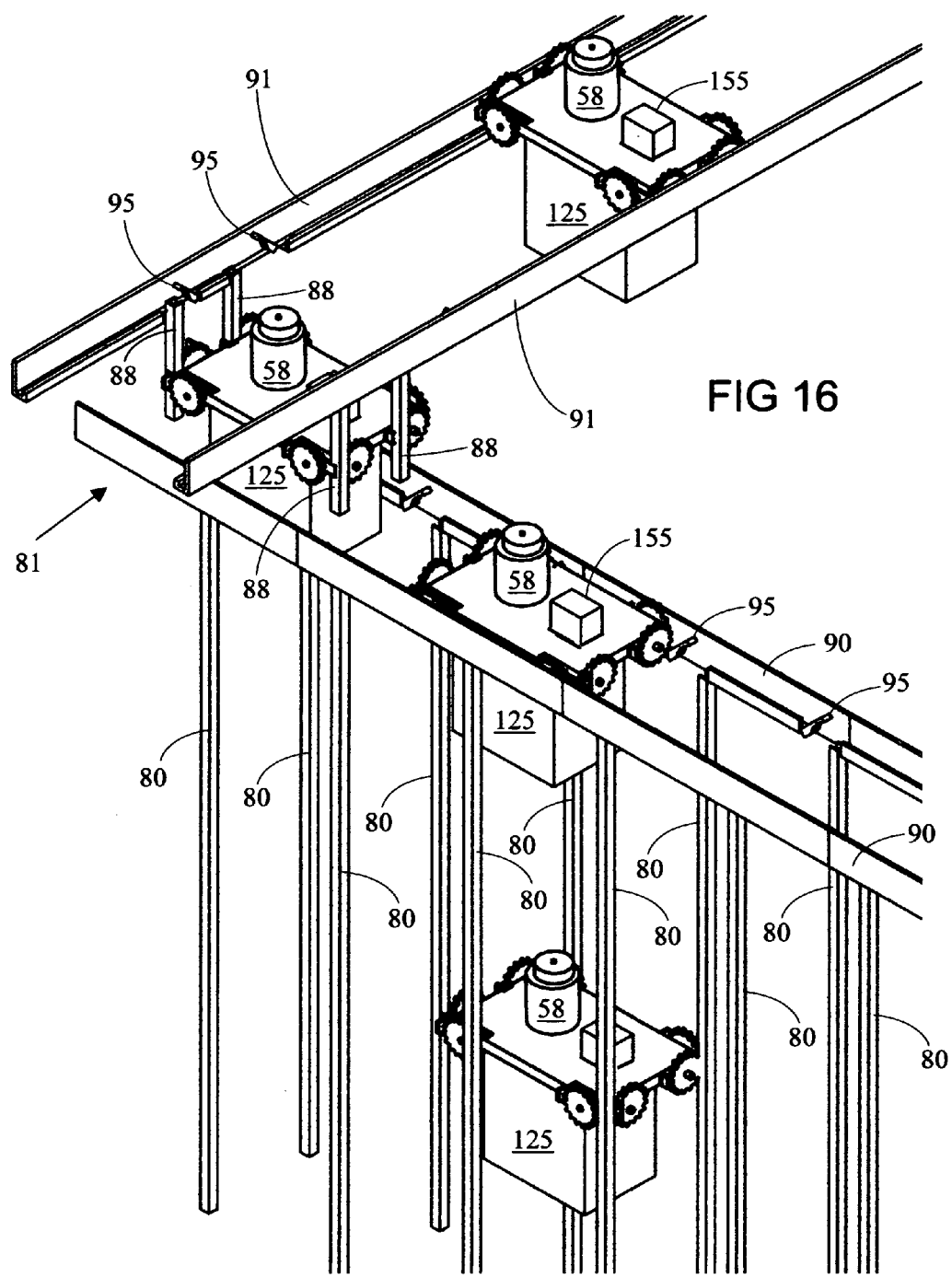
FIG. 16 shows an EDC3 traveling in the x-direction, an EDC3 lowering on short vertical rails, an EDC3 traveling in the z-direction, and an EDC3 positioned on the vertical rails.

As illustrated in FIG. 16 the transition intersections 81 uses the trapdoors 95 that open to the short vertical rails 88 to lower the EDC3 58 to a horizontal rails running perpendicular 90 from a set of upper horizontal rails 91. The short vertical rails 88 allow the EDC3 58 and attached CMBM 125 to clear the lower horizontal rails running perpendicular 90 when passing over. The short vertical rails 88 stop above the lower horizontal rails running perpendicular 90 to allow the EDC3's 58 x-direction toothed rotational device 68 to run off of the short vertical rails 88 and gently drop onto the lower horizontal rails running perpendicular 90. When the z-direction toothed rotational devices 69 are seated in the lower horizontal rails running perpendicular 90; the EDC3 58 moves in the z-direction.

As the EDC3 58 travels along the horizontal rails 79 the EDC3 58 travels over many trapdoors 95, the EDC3 58 has the option to use the trapdoors 95 to gain access to the vertical rails 80 and bins 115. As illustrated in FIG. 7 the horizontal rails 79 can be bend 86 and 87 upward to changes the elevation of the horizontal rails 79 so that the next transition intersection 81 can be used to lower the EDC3 58 onto horizontal rails running perpendicular 90 to the horizontal rails 79 the EDC3 58 is traveling on. By using the next transition intersection 81 the direction of travel can be changed from the horizontal z-direction to the horizontal x-direction. This allows the EDC3 58 to move in three-dimensions. The EDC3 58 is able to navigate in three-dimensions with the single drive motor 67 by using the rail system 78.

As shown in FIG. 16 each EDC3 58 has its own independent propulsion and mobile control device 155 so multiple EDC3s 58 can independently operate on the rail system 78 to carry out multiple tasks simultaneously. Because the rail system 78 furnishes the electrical power the EDC3s 58 can operate continuously without downtime to recharge.

As illustrated in FIGS. 17A-F when the EDC3 58 has maneuvered into position to manipulate a bin 115 the CMBM's 125 mobile control device 155 cuts power to the drive motor 67 and applies power to the drive brake 65 holding the EDC3 58 in place for the bin 115 transfer. FIGS. 17A-F illustrates the transfer of the bin 115 between the CMBM 125 and the bin rack 107. The parts shown in FIG. 6: the CMBM frame 126 the manipulator motor 131, the manipulator brake 132, the manipulator mechanical linkage 128, and the manipulator rotation sensor 156 are not shown in order to better illustrate the operation of the CMBM 125.

Figure 17A:
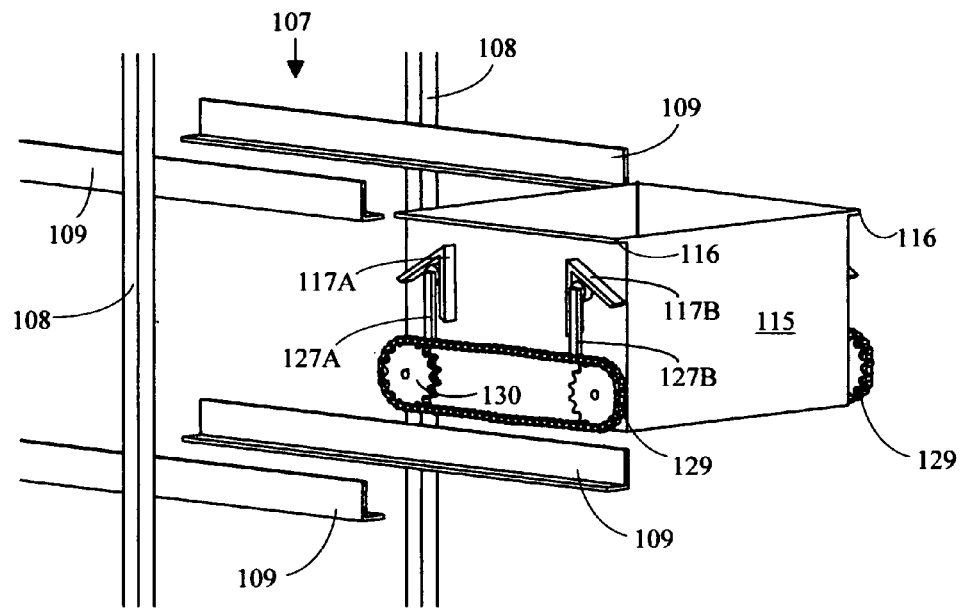
FIG. 17A shows perspective view of a bin manipulating device with enclosure removed holding a bin in the carrying position.

FIG. 17A shows the bin 115 in the carry position, the bin 115 is in the center and held in place by the manipulator arms 127A and 127B. The mobile control device 155 releases the manipulator brake 132 and starts the manipulator motor 131. The manipulator motor 131 operates the manipulator mechanical linkage 128 shown in FIG. 6, the linkage 128 rotates the manipulator arm sprockets 130 so that the manipulator arm chains 129 will articulate around the manipulator arm sprockets 130.

Figure 17B:
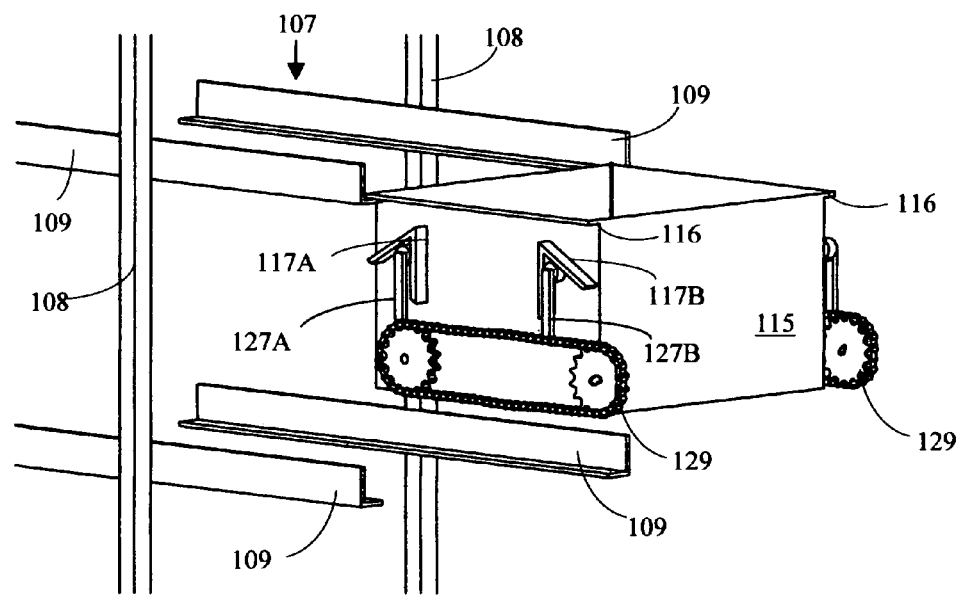
FIG. 17B shows perspective view of a bin manipulating device with enclosure removed, moving a bin from the carrying position to the shelf.

FIG. 17B illustrated how the manipulator arms 127A and 127B being attached perpendicular to the manipulator arm chains 129 will support the bin 115 as the manipulator arms 127B travels along the path of the manipulator arm chains 129. This movement places the bin lips 116 on the horizontal support surfaces 109.

Figure 17C:
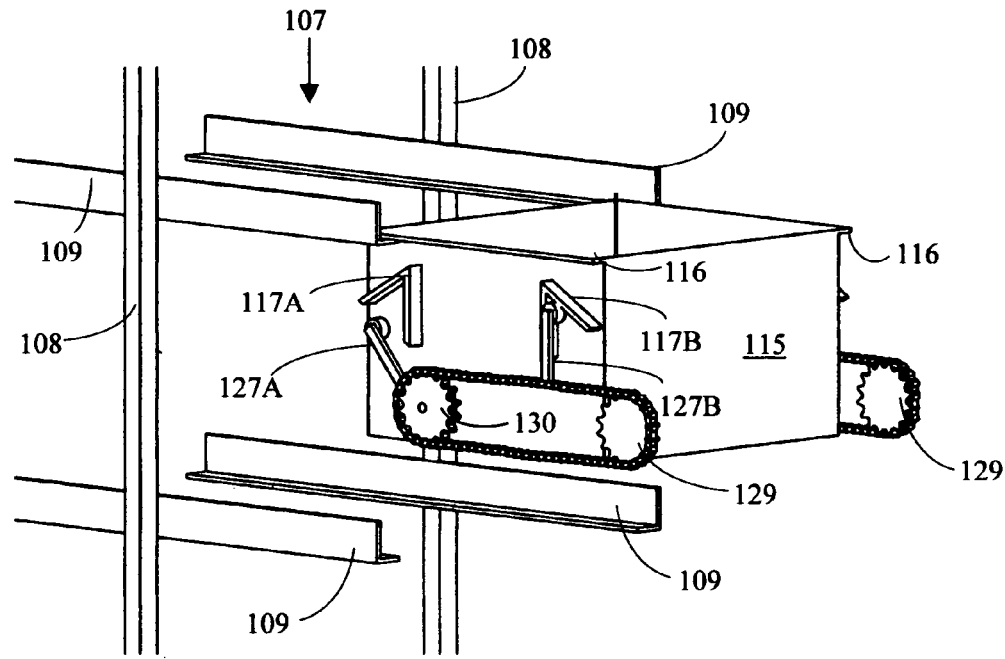
FIG. 17C shows perspective view of a bin manipulating device with enclosure removed moving a bin from the carrying position to the shelf.

FIG. 17C demonstrates how the manipulator arms 127A arc down and away from the bin grips 117A, as the manipulator arms 127B follows the curvature of the manipulator arm sprockets 130. The manipulator arms 127B continues to support and push the bin 115 as the manipulator arms 127B travels along the path of the manipulator arm chains 129. This movement places the bin lips 116 further onto the horizontal support surfaces 109.

Figure 17D:
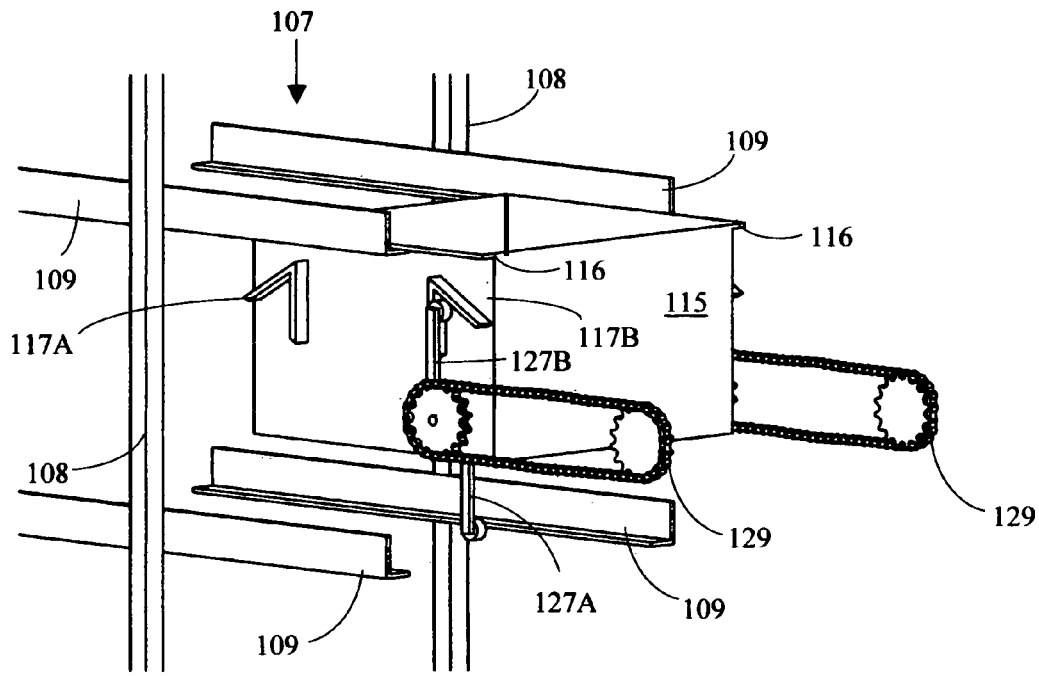
FIG. 17D shows perspective view of a bin manipulating device with enclosure removed moving a bin from the carrying position to the shelf.

FIG. 17D exemplifies how the manipulator arms 127A continue to arc around to the underside of the manipulator arm chains 129. The manipulator arms 127B continues to support and push the bin 115 as the manipulator arms 127B travels along the path of the manipulator arm chains 129. This movement places the bin lips 116 further onto the horizontal support surfaces 109.

Figure 17E:
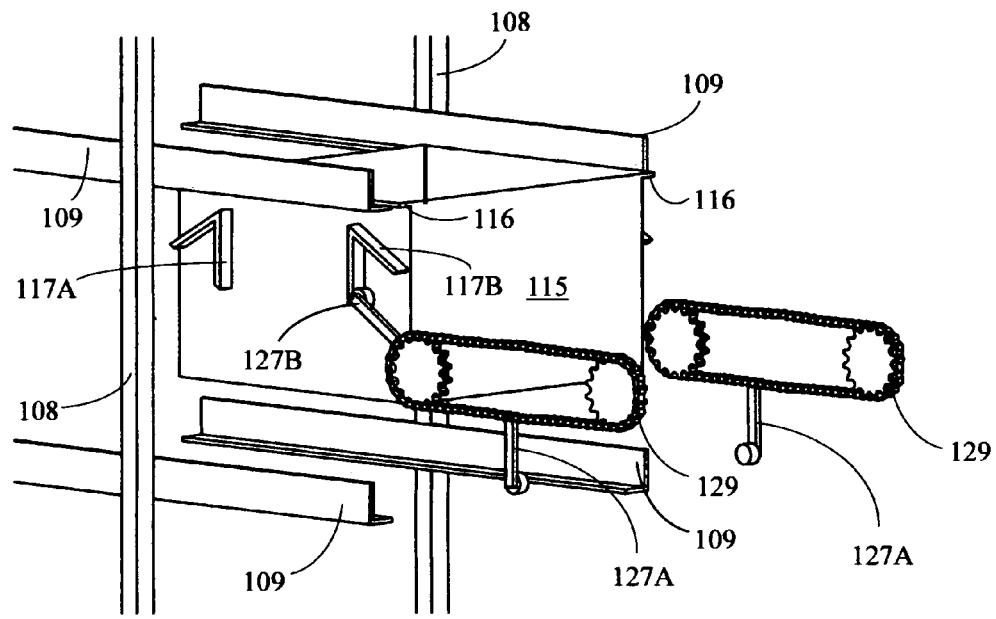
FIG. 17E shows perspective view of a bin manipulating device with enclosure removed pushing a bin onto the shelf.
Figure 17F:
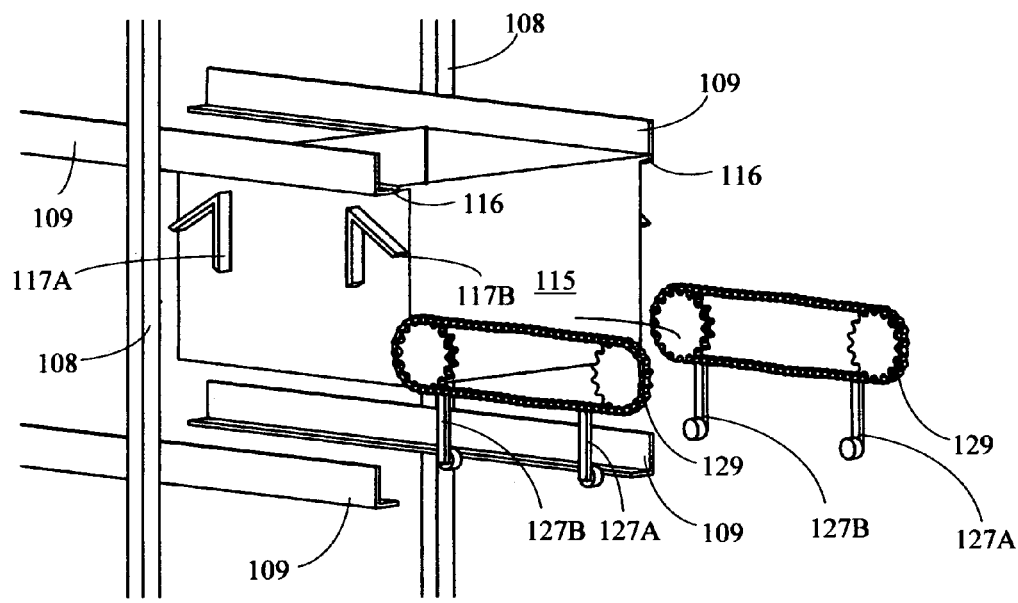
FIG. 17F shows perspective view of a bin manipulating device with enclosure removed with bin arms in the lowered position and the bin positioned on the shelf.

FIG. 17E reveals how the manipulator arms 127A continues to travel across the underside of the manipulator arm chains 129. The bin lips 116 are far enough onto the horizontal support surfaces 109 to support the weight of the bin 115. The manipulator arms 127B arc down and away from the grips 117B, as the manipulator arms 127B follows the curvature of the manipulator arm sprockets 130. The manipulator arms 127B continues to push the bin 115 as the manipulator arms 127B slides down the bin grips 117B. This movement places the bin lips 116 completely onto the horizontal support surfaces 109.

FIG. 17E shows how the manipulator arms 127A and 127B continue to travel across the underside of the manipulator arm chains 129. The manipulator arms 127A and 127B are tucked away so that the EDC3 58 can navigate to the next bin 115 to be manipulated.

To manipulate the bin 115 from the bin rack 107 to the CMBM 125, the sequence of events are reversed. The sequence starts with FIG. 17F and ends with FIG. 17A. As the manipulator arms 127B starts from the lower position and arcs outward and upward as shown in FIG. 17E the manipulator arms 127B engage the bin grips 117B. FIG. 17D illustrates the manipulator arms 127B pulling the bin 115 by the bin grips 117B into the CMBM 125 as the bin lips 116 slides off of the horizontal support surface 109. FIG. 17C demonstrates how the second set of manipulator arms 127A arc out and up to engage the bin grips 117A. FIG. 17B illustrate how the manipulator arms 127A and 127B lift and support the bin 115 as it is moved completely into the CMBM 125.

The mobile control device 155 receives a count from the manipulator rotation sensor 156 to determine when the bin 115 is in the loaded position. When the bin 115 is in the loaded position the mobile control device 155 stops the manipulator motor 131 and locks the manipulator brake 132. In this position, the bin 115 is held securely for transport.

The bin 115 and its contents are then transported by the EDC3 58 to the location where the bin 115 is to be manipulated from the EDC3 58 to the rack 107. The CMBM 125 can load or unload the bin 115 from either side. The manipulator motor 131 drives the manipulator arms in the direction the bin 115 is to be manipulated.

FIG. 18 is a block diagram of an equipment control system 140. Major control components of the equipment control system 140 include: the customer interface panel 47, a remote override 158, a main computer 146, a stocking barcode reader 152, a stationary electromagnetic transceivers 154, and a mobile electromagnetic transceivers 153, the mobile control devices 155, the drive rotation sensors 151, the manipulator rotation sensors 156, the drive motor 67, the manipulator motors 131, the drive brake 65, the manipulator brake 132, and a relay block 150.

The stocking barcode reader 152 is used to read barcodes, information such as product identification numbers 301, bin identification numbers 302, and rack identification numbers 303 are sent to the main computer 146. This information is stored in a database 157.

A user drives or walks up to the delivery access panel 46. Using a touch screen, keyboard, voice commands or other customer interface device 47 the user is able to view available items and applicable prices. The user places an order and pays for the items by operation of the customer interface device 47. The main computer 146 checks the database 157 for the location in the storage area 43 that contains the bin 115 that contains the desired item. The database 157 has stored a unique set of commands to direct the EDC3 58 to the bin 115 location, commands to operate the CMBM 125, commands to direct the EDC3 58 to deliver the bin 115 to the appropriate delivery access panel 46, commands to directs the EDC3 58 to return to a holding area to wait for the next sets of commands. These commands are sent from the main computer 146 by the stationary transceiver 154. The mobile transceiver 153 located on the EDC3 58 receives the signal and sends it to the mobile control device 155. The EDC3 58 receives information from the drive rotation sensors 151, and the manipulator rotation sensors 156. The EDC3 58 uses this information to determine when to apply power to relays in the relay block 150. The relays control the power to the drive motor 67, and the drive brakes 65. By starting, stopping and reversing the drive motor 67, the mobile control device 155 controls the navigation of the EDC3 58 in three-dimensions. The relays control the power to the manipulator motor 131, and manipulator brakes 132. By starting, stopping and reversing the manipulator motor 131, the mobile control device 155 controls the manipulation of bins 115.

The remote override 158 sends signals to the main computer to fix problems, do maintenance and handle difficult transactions.

FIG. 2 illustrates a vendor loading panel 160, the vendor loading panel 160 allows a vendor access to the bins 115 while the bins 115 are suspended in the bin racks 107. This keeps the vendor from being exposed to dangerous moving parts and reduces pilfering.

DESCRIPTION

Alternate Embodiments for Transport

FIG. 19

Figure 19A:
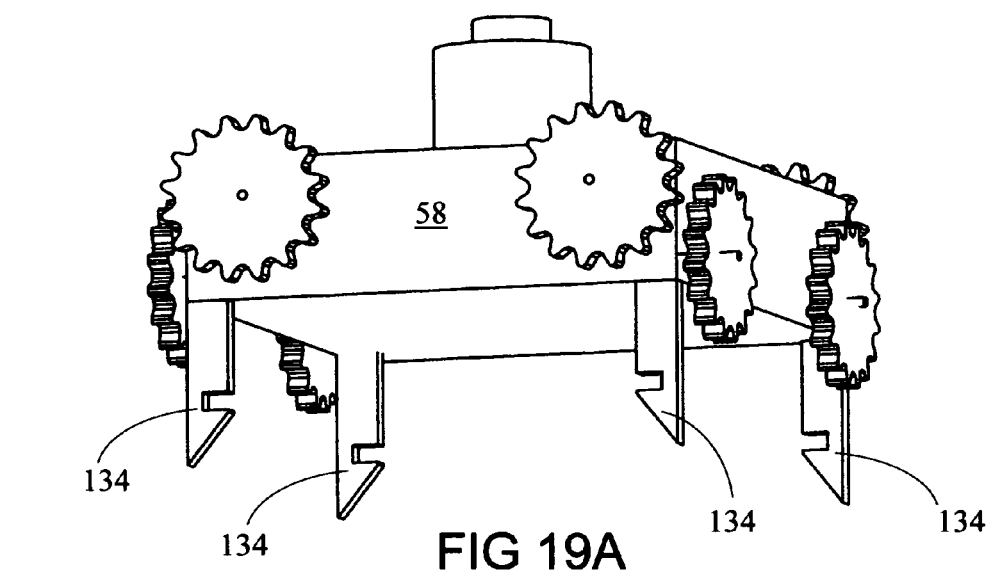
FIG. 19A shows perspective view of alternative embodiment of the bin manipulating device with claws or hooks.

There are various possibilities with regard to how the EDC3 58 can be used to transport and store items, FIG. 19 shows a bin hooks 134 mounted to the EDC3 58. The bin hooks 134 would replace or work with the CMBM 125. The hooks are torsion mounted with attached solenoid operators (not shown). This alternate embodiment uses stackable bins 118; the stackable bins 118 have stackable bin lips 119.

OPERATIONS

Alternate Embodiments for Bin Manipulation

FIG. 19B

Figure 19B:
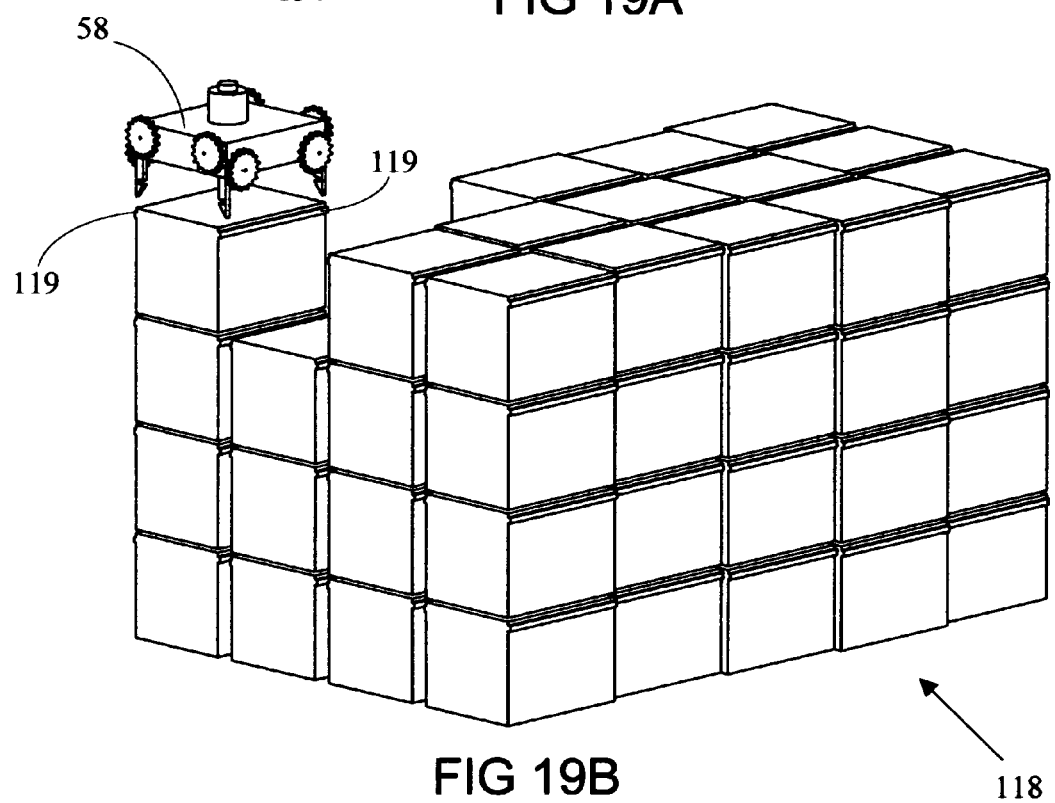
FIG. 19B shows perspective view of the alternative embodiment of the bin manipulating device with claws or hooks stacking bins.

As illustrated in FIG. 19B the bin hooks 134 slide over the stackable bin lips 119 as the EDC3 58 is lowered over the stackable bins 118, the bin hooks 134 locks around the stackable bin lips 119 so the EDC3 58 can transport the stackable bins 118. This allow for the loading and unloading of trucks, containers, boats, aircraft or any enclosed space. When the bins 115 are lowered into place, the bin hooks 134 open up and release the stackable bins 118.

DESCRIPTION

Alternate Embodiments for Mechanical Linkage

FIG. 20

Figure 20A:
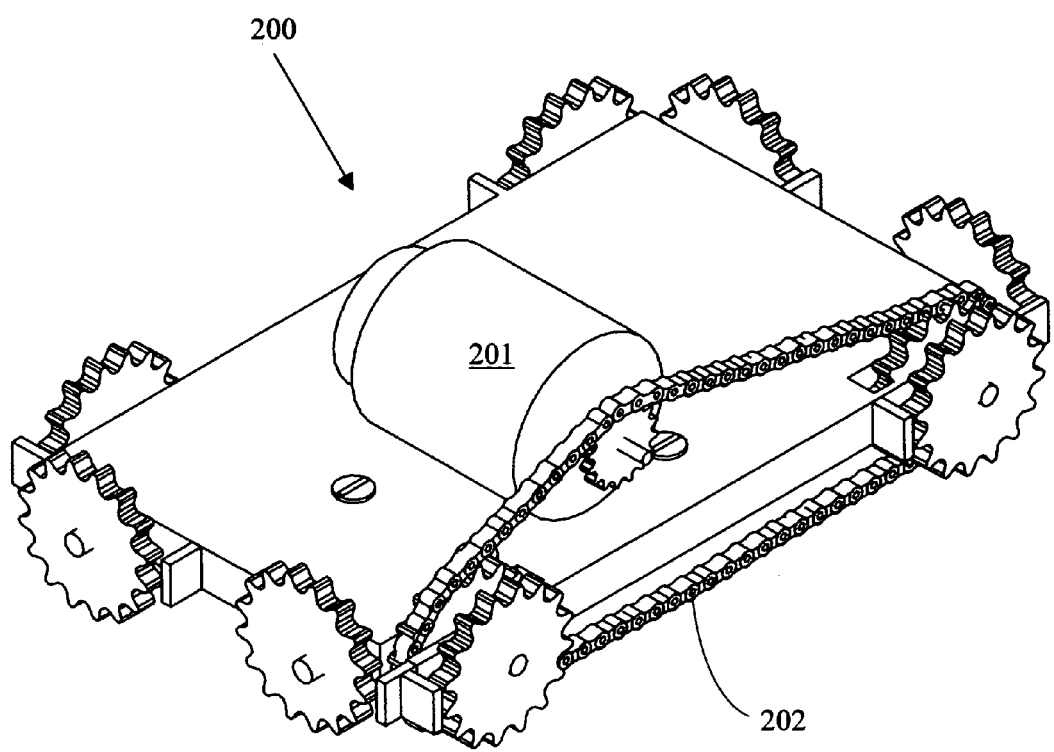
FIG. 20 shows perspective view of the alternative embodiment of the EDC3.

There are many possible arrangements for the drive mechanical linkage 66 to propel the EDC3 58. FIG. 20 shows an alternate embodiment of the EDC3 58 using chain 202 as a linkage between the drive motor 201 and the toothed rotational devices 68 and 69. The operation of the alternate embodiment of the EDC3 200 is the same as the preferred embodiment of the EDC3 58 shown in FIG. 4A and FIG. 4B.

DESCRIPTION

Additional Embodiments for Trapdoor

FIGS. 21A-E, 22

Figure 21E:
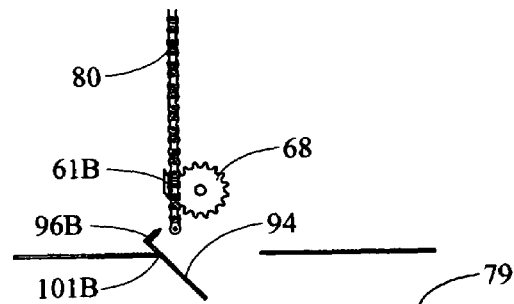
FIG. 21E shows an elevation view of alternative embodiment of the trapdoor with the toothed rotational device engaging the vertical rail.
Figure 21C:
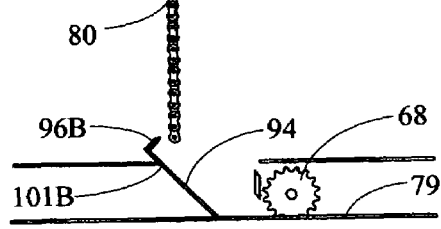
FIG. 21C shows an elevation view of alternative embodiment of the trapdoor with the toothed rotational device reversing after passing under the trapdoor.
Figure 21D:
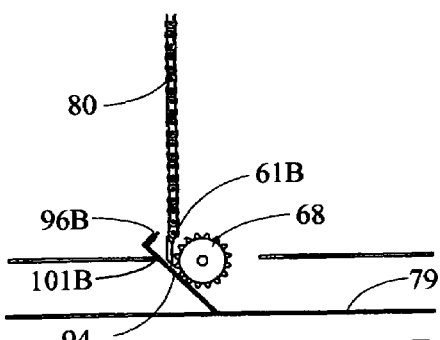
FIG. 21D shows an elevation view of alternative embodiment of the trapdoor with the toothed rotational device climbing up the trapdoor.
Figure 21A:
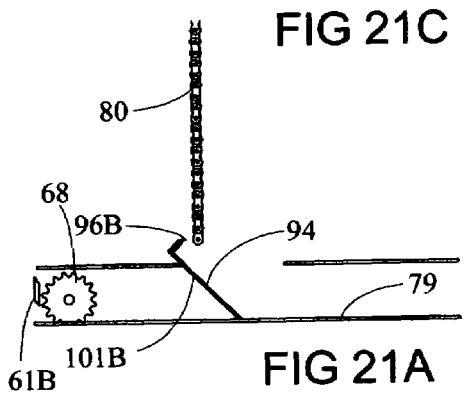
FIG. 21A shows an elevation view of alternative embodiment of the trapdoor with the toothed rotational device approaching the trapdoor.
Figure 21B:
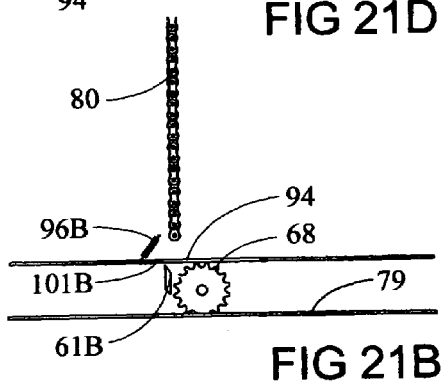
FIG. 21B shows an elevation view of alternative embodiment of the trapdoor with the toothed rotational device moving under the trapdoor.

FIG. 21A shows a hatch door 94 consisting of all the same parts as the-trapdoors 95; the hatch door 94 is mounted above the horizontal rails 79. To simplify the illustration only one toothed rotational device 68 is shown. As illustrated by FIG. 21B the operation of the hatch door 94 allows the toothed rotational device 68 of the EDC3 58 to push the hatch door 94 up and out of the way when passing underneath the hatch door 94 from the torsion mounted hinge device 96. FIG. 21C shows the point in the operation sequenced when the tooth rotational device 68 reverses rotation and moves toward the open hatch door 94. FIG. 21D shows the position of the tooth rotational device 68 after it has climbed the hatch door 94 and is in position to lock the toothed rotational device 68 to the vertical rails 80 with the rails guide 61B sliding up the opposite side of the vertical rails 80. FIG. 21E illustrates the tooth rotational device 68; locked in by the rail guide 61B traveling up and vertical rails 80.

Figure 22:
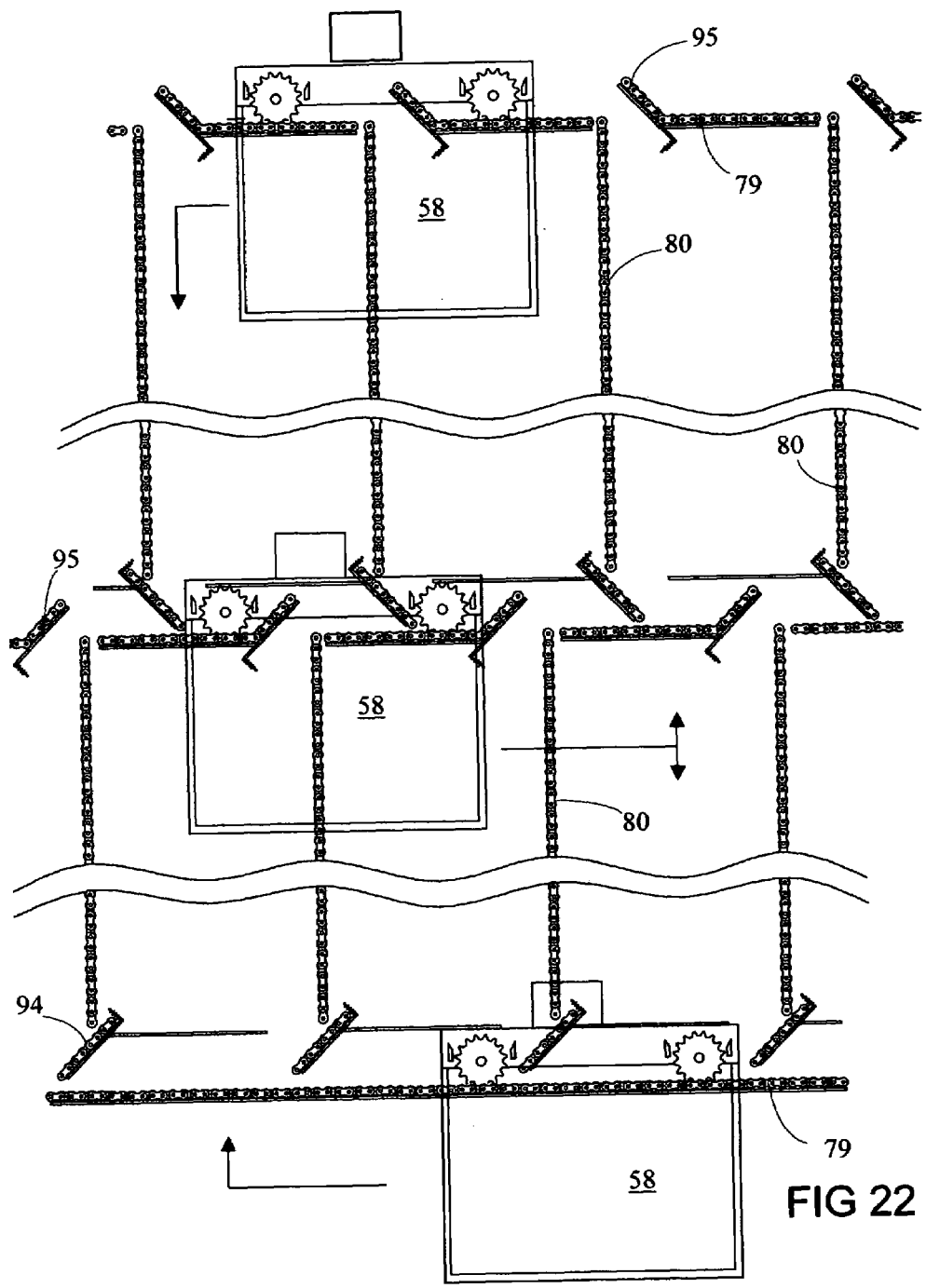
FIG. 22 shows an elevation view of alternative embodiment of the trapdoor combined with the preferred embodiment of the trap door.

FIG. 22 illustrates a combination of trapdoors 95 and hatch doors 94 used together to provide multiple paths for the EDC3s 58 to operate. With the combination arrangement EDC3s 58 can reach bins 115 from at least two different paths. This would be very useful to allow EDC3s 58 to be rerouted if a breakdown of an EDC3 58 block one of the paths.

DESCRIPTION

Additional Embodiments

FIGS. 24, 25, 25, 26

Figure 23:
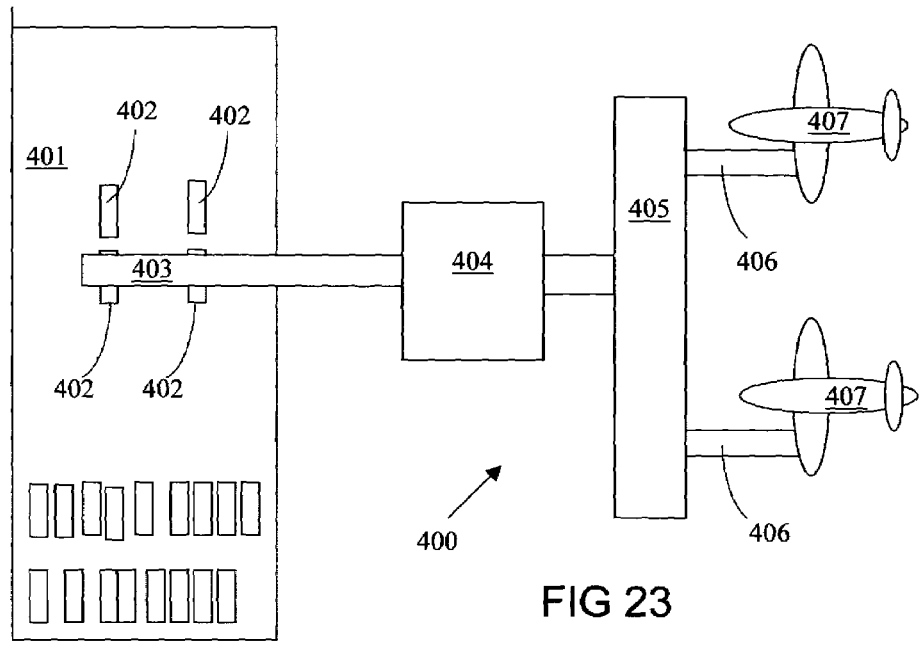
FIG. 23 shows an overhead view of additional embodiment of the A3DMSSDS being used in an airport.

Additional embodiments are shown in FIG. 23, FIG. 24, FIG. 25 and FIG. 26. FIG. 23 is the layout of an airport 400; shown are a parking lot 401, a plurality of passengers' cars 402, a passenger access point 403, a security screening area, 404 a passenger terminal 405, a plurality of jet bridges 406, a plurality of aircraft 407. All of these items are connected by a rail system 78 as described in preferred embodiment.

Figure 24:
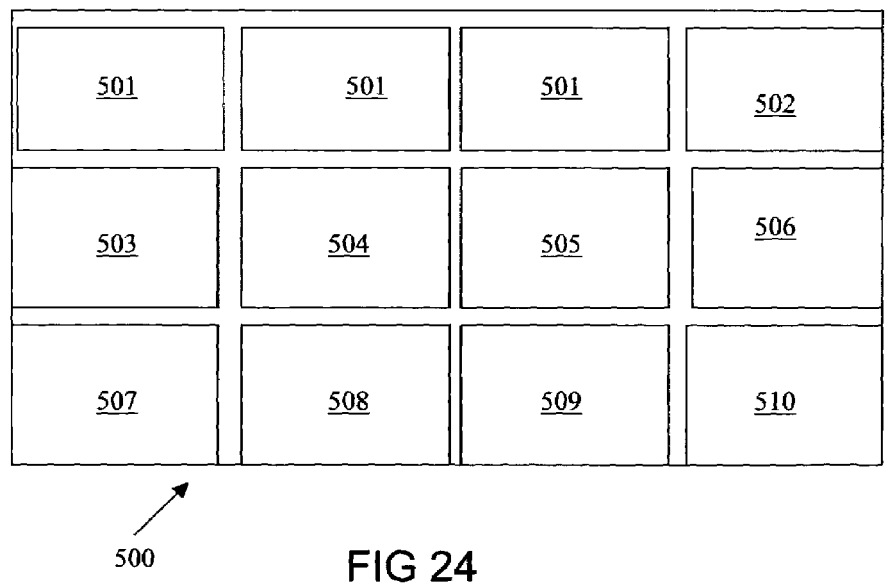
FIG. 24 shows an elevation view of additional embodiment of the A3DMSSDS being used in a hospital.

FIG. 24 is a layout of a hospital 500; shown are patient rooms 501, an intensive care unit 502, an exam room 503, an operating room, 504 a x-ray room 505, an emergency room 506, a kitchen 507, a storage area 508, a pharmacy 509, a laboratory 510, and a trash/medical waste area 511. All of these areas are connected by a rail system 78 as described in the preferred embodiment.

Figure 25:
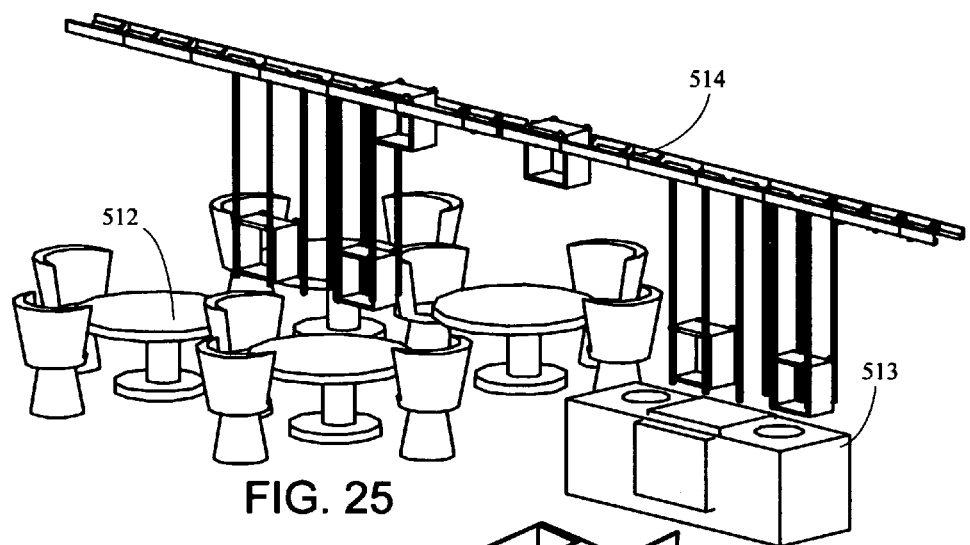
FIG. 25 shows a perspective view of additional embodiment of the A3DMSSDS being used in a restaurant.

FIG. 25 is a layout of a restaurant; shown are a plurality of customer tables 512, a kitchen processing area 513 and a smart server 514. Not shown is the structure of the restaurant, which is not part of this invention.

Figure 26:
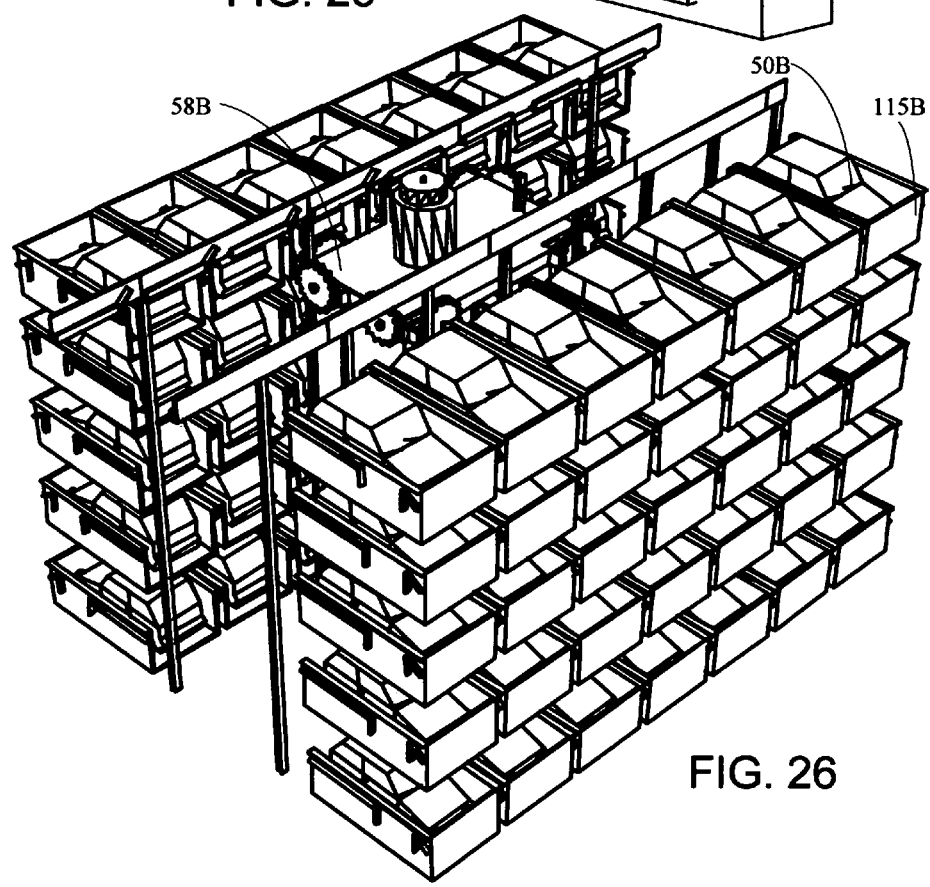
FIG. 26 shows a perspective view of additional embodiment of the A3DMSSDS being used in a parking garage.

FIG. 26 is a layout of a parking garage; shown are a plurality of parked vehicles 50B, a plurality of vehicle bins 115B, and a large EDC3 58B. Not shown is the structure of the parking garage, which is not part of this invention.

OPERATIONS

Additional Embodiments

FIGS. 24, 25, 25, 26

As shown in FIG. 23 the passenger arrives at the parking lot 401, the passenger takes her luggage to the passenger access point 403. The CMBM 125 takes the passenger's luggage through the necessary screening processes in the security screening area 404. The CMBM 125 then takes the screened luggage to the aircraft 407. After the passenger drops off her luggage, she proceeds to the passenger terminal 405, the jet bridge 406, and onto the aircraft 407. When the plane lands the luggage is delivered to the passenger access point 403 when called for by the passenger. This would greatly increase the convenience of flying and reduce injury caused by dragging luggage over great distance. A major advantage is that unscreened luggage would be kept out of a terminal where there are large numbers of unprotected passengers; preventing passengers in from being killed or injured by explosives or other terrorist devices.

As shown in FIG. 24 medical supplies, food, linen, lab samples, waste, medical waste, x-rays, or any other item can be transported over a rail system 78 by EDC3s 58 from the patient rooms 501, the intensive care unit 502, the exam room 503, the operating room, 504 the x-ray room 505, the emergency room 506, the kitchen 507, the storage room 508, the pharmacy 509, the laboratory 510, and the trash/medical waste deposal area 511. This relieves the staff of the drudgery of transporting items from one area to another. This system would also provide an accountability of drugs, supplies and waste.

As shown in FIG. 25; the smart server 514 can move food, beverage and condiments from the kitchen processing area 513 to the customer tables 512. When the meal is done the smart server, 514 can move the remains of the meal from the customer tables 512 to the kitchen processing area 513

As shown in FIG. 25; the vehicle 50B, is parked the vehicle bin 115B, and the large EDC3 58B picks up the vehicles 50B in the vehicle bins 115B, and moves the loaded vehicle bins 115B to a storage space. When the vehicles 50B is needed the process is reversed and the EDC3 58B removes the vehicle bins 115B with the vehicles 50B inside, and moves the loaded vehicle bins 115B to a pickup space.

CONCLUSION, RAMIFICATIONS AND SCOPE

Thus the reader will see that the Automated 3-Dimensional, Multitasking Item Stocking, Storage and Distribution System of the invention provides a plurality of electrically driven, computer-controlled carriage that navigate a three-dimensional system of electrified rails. When the electrically driven, computer-controlled carriages are in place, bin handling devices manipulate bins in and out of the racks. The bin serves as a holding device for items. The delivery and storage of items will be directed and monitored by a computer. The automated storing and delivery of items will greatly reduce labor requirements, reduce inventory errors, increased the security of the items and provide an overall convenience to the user. The ability to store items for flexible periods of time and then have the items delivered at a moments notice would preclude the need for the continuous staffing of a delivery process. Programmable devices have resulted from economical computer components and increased computing capability. Furthermore, the stocking, storage and distribution system has the additional advantages in that:

EDC3s can work simultaneously to accomplish tasks;
the system can be storing items and delivering items at the same time;
each EDC3 only needs one reversible motor to navigate the matrix;
each EDC3 only needs one reversible motor to store and deliver items;
the EDC3 and rail system is built of mostly stock parts, that can be put together in modular form;
the system design that does not require high cost stepper motors, servos, elevators, conveyors, transfer platforms, robotic arms, chutes, turntables, nor rail switchers;
the system has the capacity to store hundreds of varieties of items;
the system has the capacity of storing as few as one unit of any type of item;
the system can be designed where the user will be able to pick up items from the safety and security of her vehicle;
the bins are loaded with items away from the dangers of moving parts;
item loading can be accomplished with a minimum of errors and pilfering;
the item stay in the same bin until removed by the consumer; this would decrease the chances of damage to the merchandise;
an image is recorded with each transaction to allow verification of delivery.

While the above description contains much specificity, these should not be construed as limitations on the scope of the invention, but rather as an exemplification of one preferred embodiment thereof. Many other variations are possible. For example: automated delivery/storage system for warehouses, video stores, equipment rental, book stores, libraries, apartment/hotel, individual homes, mail/package services, manufacturing plants, hazardous material, and ammunition. The system could be used for transportation of humans in three-dimensions; storage of live humans will not be necessary. The EDC3 can be adapted to transport robotic arms, surveillance equipment, tools or other attachments. Batteries could furnish the electric power or batteries could be used as backup power. Accordingly, the scope of the invention should be determined not by the embodiments illustrated, but by the appended claims and. their legal equivalents.

I claim:

1. An automated 3-dimensional multitasking, product stocking, storage and distributing system comprising:
   a) a system of rails comprising:
      i) a plurality of horizontal rails running in the x-direction and a plurality of vertical rails running in the y-direction,
      ii) said rails have a plurality of notches to provide a means for meshing with toothed rotational devices,
      iii) said rails are paired and mounted to allow open spaces between said rails,
      iv) said horizontal rails running in the x-direction are interrupted along their length by a plurality of trapdoors,
      v) said trapdoors have a hinge mechanism on one side and are torsion mounted to be normally in the open position,
      vi) said trapdoors close when toothed rotational devices roll onto said trapdoors from said hinged side,
      vii) said trapdoors when closed, complete said horizontal rails running in the x-direction, preventing access to said vertical rails running in the y-direction,
      viii) when said toothed rotational devices roll into said trapdoors from the open side, said trapdoors guide said toothed rotational devices onto said vertical rails running in the y-direction,
      ix) when said toothed rotational devices reverse direction of rotation on said vertical rails running in the y-direction, the said trapdoors guide said toothed rotational devices back onto said horizontal rails running in the x-direction, whereby access to and from said horizontal rails running in the x-direction, to and from said vertical rails running in the y-direction is facilitated,
b) a plurality of carriages, each of said carriages comprising:
  i) a frame of dimensions to fit between pairs of said rails,
  ii) a drive motor mounted on said frame for producing rotational energy from said drive motor,
  iii) a plurality of the toothed rotational devices,
  iv) a means for controllably coupling rotational energy from said drive motor to said toothed rotational devices,
    whereby said carriage can be propelled along said horizontal rail,
  v) a plurality of rail guides are mounted fore and aft of said toothed rotational devices, said rail guides engage said vertical rails running in the y-direction to provide a means to hold said toothed rotational devices meshed with said vertical rails running in the y-direction,
    whereby said carriages can be propelled up and down said vertical rails running in the y-direction,
  vi) a braking system to hold said carriages in place when operating on said vertical rails running in the y-direction,
  vii) a sensor to indicate location of said carriages on said system of rails,
  viii) a control device to receive instructions and act in concert with said sensor to provide a means to control said carriages,
    whereby said carriages will be self propelled and self controlled along said system of rails.

2. An automated system as set forth in claim 1 wherein said carriages and rail system includes:
a) a plurality of horizontal rails running in the z-direction, perpendicular to said horizontal rails running in the x-direction,
  i) said horizontal rails running in the z-direction rails are positioned under predetermined lengths of the vertical rails running in the z-direction,
    whereby said carriage can be lowered from said horizontal rails running in the x-direction to said horizontal rails running in the z-direction,
    whereby said carriages change direction of travel on the horizontal plane,
  ii) said horizontal rails running in the z-direction having the same said notches and trapdoors as the said horizontal rails running in the x-direction,
  iii) a predetermined bend changes the slope of said horizontal rails running in the z-direction allowing the end of said horizontal rails running in the z-direction to have sufficient elevation to facilitate said carriages to be lowered through said trapdoors onto said vertical rails running in the y-direction, said carriage is lowered onto said rails running in the x-direction,
b) a second set of toothed rotational devices are mounted to said carriages' frames,
  i) said second set of toothed rotational devices are arranged perpendicular to said toothed rotational devices,
  ii) said second set of toothed rotational devices provide the same means of motion in the z-direction and the y-direction, as said toothed rotational devices, provided in the x-direction and the y-direction,
    whereby said carriages on said rails can travel in three-dimensions.

3. The automated system of claim 2 wherein a bin manipulator is mounted to each of said carriages' said bin manipulators are each comprised of:
a) a framework for transporting bins,
b) said bins comprising:
  i) enclosures of a predetermined shape to hold what is to be transported,
  ii) lips for said container to slide on while being manipulated and rest on while said bins, are being transported,
c) a manipulator means, comprising:
  i) a plurality of hitches to provide a means for manipulator arms to engage said bins by said hitches,
  ii) a manipulator motor mounted on said frame for producing rotational energy from said manipulator motor,
  iii) a means for controllably coupling rotational energy from said manipulator motor to said manipulator arm,
    whereby said manipulator arm can extend to said hitches and pull said bins into said framework for transporting or push said bins out of said framework for transporting.

4. The automated system of claim 3, further including a system of racks, comprising:
a) a plurality of vertical support structures,
b) said vertical support structures support a plurality of horizontal support surfaces,
d) said horizontal support surfaces serve to support said bins
e) a plurality of access panels, comprising:
  i) a plurality of customer interface devices to facilitate transactions,
  ii) a plurality of delivery access panels to facilitate delivery and removal of items from said bins,
f) a loading access panel to allow items to be loaded into bins.

5. The automated system of claim 4, further including an enclosure, said enclosure constructed to provide structure, protection, insulation environmental control and security.

6. The automated system of claim 5 wherein said rails are electrified to supply electrical power for said drive motor, manipulator motor and control device.

7. The automated system of claim 6 further including an electronic control system, said electronic control system provides a human interface, said human interface facilitates instructions and is used to resolve problems.

8. The automated system of claim 7, further including a means to deliver items to customers, comprising:
a) an inner and outer door, to allow access to said bins,
b) an interlock, said interlock prevents said inner and outer door from being open at the same time,
  whereby exposure to said electrified parts is prevented,
c) an imaging device, said imaging device records an image of said bins.

* * * * *